(12) United States Patent
Babikian et al.

(10) Patent No.: US 6,966,364 B1
(45) Date of Patent: Nov. 22, 2005

(54) SYSTEMS AND METHODS FOR CONTROLLING LOCAL ENVIRONMENT

(75) Inventors: Dikran S. Babikian, Millbrae, CA (US); Bryan H. Wade, Union City, CA (US)

(73) Assignee: ASML Holding N.V., (NL)

( * ) Notice: Subject to any disclaimer, the term of this patent is extended or adjusted under 35 U.S.C. 154(b) by 0 days.

(21) Appl. No.: 09/248,768

(22) Filed: Feb. 12, 1999

(51) Int. Cl.$^7$ .......................... F24F 3/14; B05B 15/12; B01D 47/06; B01D 47/12
(52) U.S. Cl. .................... 165/228; 165/60; 165/230; 236/44 B; 236/44 C; 62/171; 62/173; 62/304; 62/309; 62/310; 62/314; 62/90; 62/91; 62/3.3; 62/3.7; 261/130; 261/131; 261/147; 261/151; 261/98; 454/187
(58) Field of Search .................... 62/171, 173, 314, 62/310, 309, 304, 91, 90, 37, 201, 434, 435, 62/3.3, 3.7; 236/44 B, 44 C; 261/402, 98, 261/130, 131, 147, 151; 165/228, 60, 230; 454/187

(56) References Cited

U.S. PATENT DOCUMENTS

| | | | |
|---|---|---|---|
| 2,419,119 A | | 4/1947 | Christensen .................... 257/3 |
| 2,545,491 A | | 3/1951 | Ohlheiser ........................ 257/3 |
| 2,681,217 A | | 6/1954 | Pennington et al. .......... 261/98 |
| 2,828,761 A | * | 4/1958 | Weibert, Jr. ................... 62/171 |
| 2,834,188 A | * | 5/1958 | Bradford ...................... 62/309 |
| 3,299,620 A | | 1/1967 | Hollingworth |
| 3,385,352 A | | 5/1968 | Engalitcheff, Jr. ............ 165/60 |
| 3,424,231 A | * | 1/1969 | Truhan ......................... 165/60 |
| 3,533,607 A | * | 10/1970 | Powers |
| 3,564,860 A | * | 2/1971 | Reich et al. .................. 62/3.7 |
| 3,861,164 A | * | 1/1975 | Brown .......................... 62/91 |
| 4,044,078 A | * | 8/1977 | Curtis et al. ................. 261/151 |
| 4,173,924 A | * | 11/1979 | Bradshaw |
| 4,312,189 A | | 1/1982 | Cotton, Jr. ................. 62/176 C |
| 4,333,887 A | * | 6/1982 | Goettl .......................... 261/27 |
| 4,343,348 A | * | 8/1982 | Scourtes ........................ 62/90 |
| 4,394,139 A | | 7/1983 | Board ........................ 261/113 |
| 4,574,062 A | * | 3/1986 | Weitman ..................... 261/131 |
| 4,602,503 A | | 7/1986 | Hile et al. .............. 73/432 SD |
| 4,711,294 A | | 12/1987 | Jacobs et al. ............... 261/128 |
| 4,750,545 A | | 6/1988 | Hile et al. ..................... 165/60 |
| 4,951,738 A | * | 8/1990 | Litzberg ..................... 165/301 |

(Continued)

FOREIGN PATENT DOCUMENTS

DE        1179689      10/1964

(Continued)

OTHER PUBLICATIONS

McCabe and Smith, *Unit Operations of Chemical Engineering* (1976) at pp. 756-769.

(Continued)

*Primary Examiner*—John K. Ford
(74) *Attorney, Agent, or Firm*—Blakely, Sokoloff, Taylor & Zafman LLP

(57) ABSTRACT

The present invention provides systems and methods of controlling local environment. In one embodiment, incoming air enters a contactor such the Direct Contact Cooler-Condenser (DCCC) where the air contacts water distributed on the contact media. After passing through the DCCC, the air is saturated at a temperature equal or close to that of the water. Depending on the state of the incoming air, in the DCCC will be humidified or dehumidified to yield saturated air at the desired humidity ratio. In one embodiment, a blower draws air through the DCCC and blows into the heater. The heater heats the air to the desired dry-bulb temperature. Before exiting, the air may pass through a filter.

16 Claims, 11 Drawing Sheets

U.S. PATENT DOCUMENTS

| | | | |
|---|---|---|---|
| 5,086,829 A * | 2/1992 | Asakawa | 165/301 |
| 5,188,169 A | 2/1993 | Lim | 165/48.1 |
| 5,326,316 A * | 7/1994 | Hashimoto et al. | 454/187 |
| 5,584,183 A * | 12/1996 | Wright et al. | 62/3.7 |
| 5,802,862 A | 9/1998 | Eiermann | |

FOREIGN PATENT DOCUMENTS

| | | | | |
|---|---|---|---|---|
| EP | 0238979 | | 9/1987 | |
| EP | 0588052 | | 3/1994 | |
| EP | 0766050 | | 4/1997 | |
| JP | 56-119434 | * | 9/1981 | 165/60 |
| JP | 58-213136 | * | 12/1983 | 165/60 |
| JP | 59-84617 | * | 5/1984 | |
| JP | 59-185922 | * | 10/1984 | 165/60 |
| JP | 61-24933 | * | 2/1986 | 454/187 |
| JP | 61122433 | | 6/1986 | |
| JP | 62-77534 | * | 4/1987 | 454/187 |
| JP | 62-268941 | * | 11/1987 | 454/187 |
| JP | 5-256468 | * | 10/1993 | 454/187 |
| JP | 8-5131 | * | 1/1996 | |

OTHER PUBLICATIONS

Chang & Sze editors, *ULSI Technology*, Cleanroom Technology, pp. 1-9 and 12-21 (1996).

McCabe and Smith, *Unit Operations of Chemical Engineering*, Gas Absorption, pp. 707-711 (1976).

Perry & Chilton, *Chemical Engineer's Handbook*, p. 18-19 through p. 18-32 (1973).

Weber, *An Introduction to Process Dynamics and Control*, pp. 100-111 (1973).

Horowitz & Hill, *The Art of Electronics*, pp. 360, 618, and 901 (1989).

Mills, *Heat and Mass Transfer*, pp. 1089-1108 (1995).

Irvine & Lily, *Steam and Gas Tables With Computer Equations*, pp. xiii-xiv, 3-5, 21-24, 26-27, and 38-41 (1984).

* cited by examiner

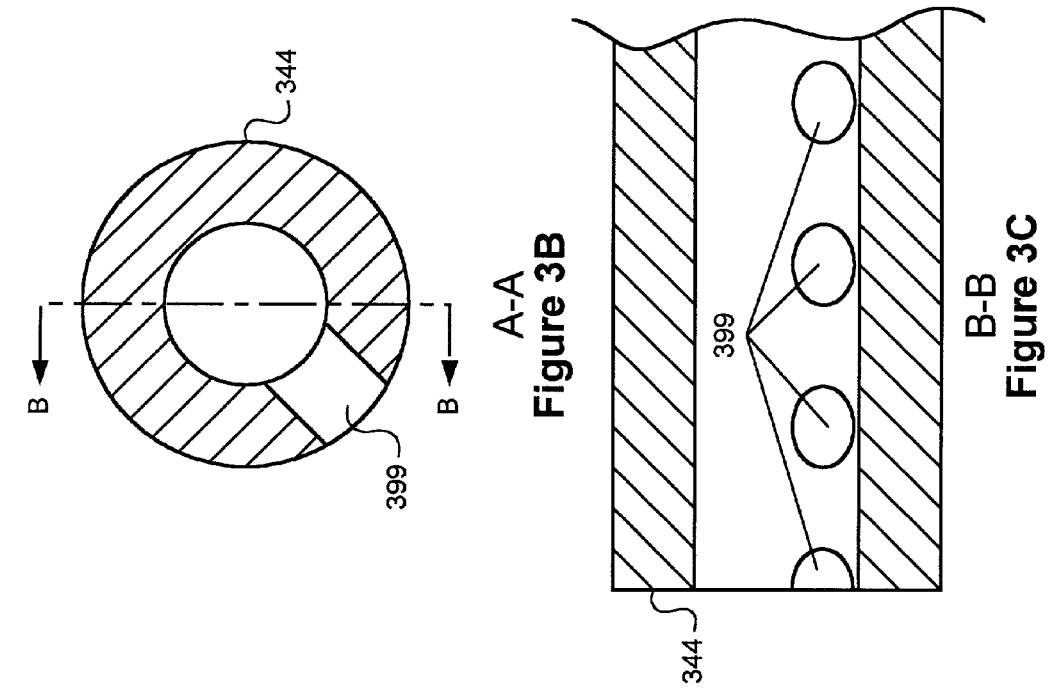
A-A
Figure 3B
B-B
Figure 3C
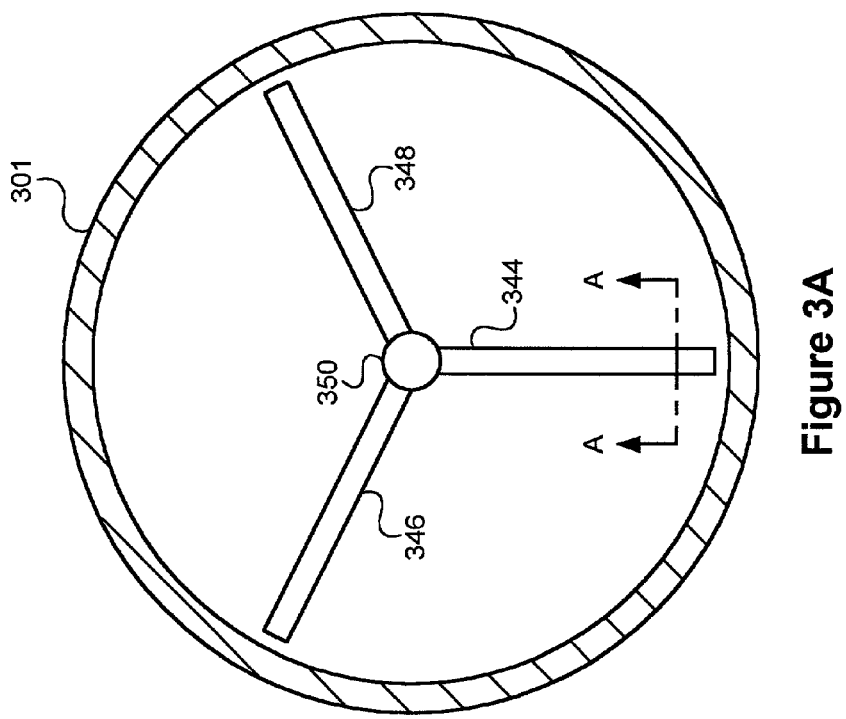
Figure 3A

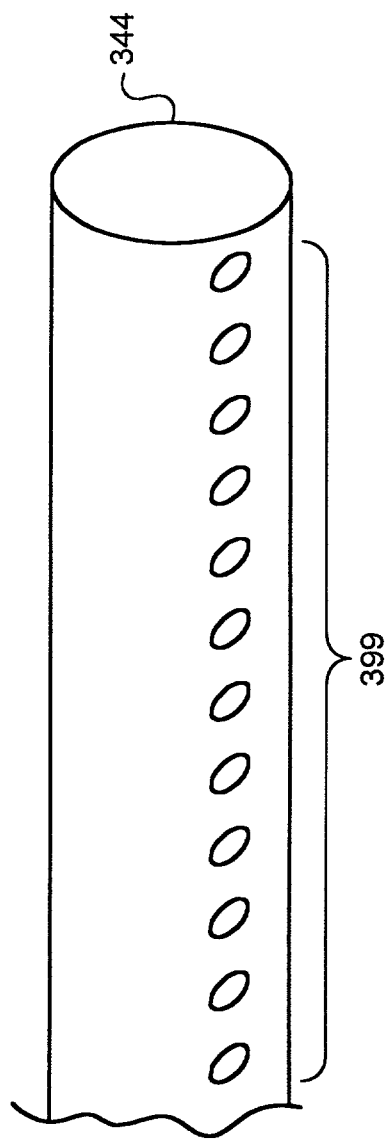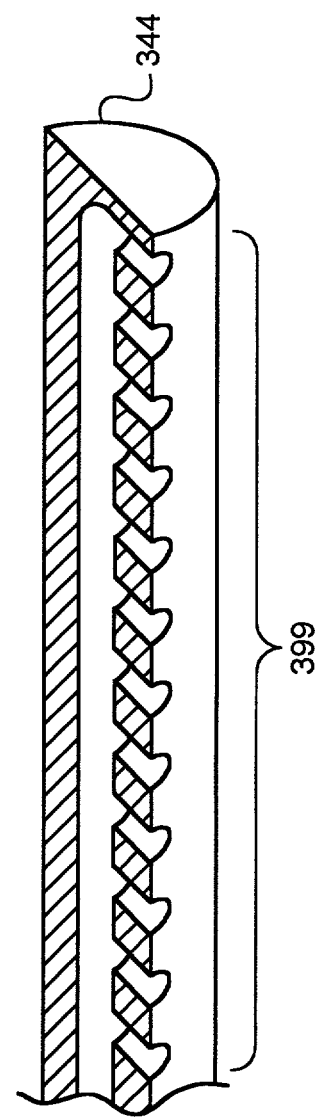
Figure 3D
Figure 3E

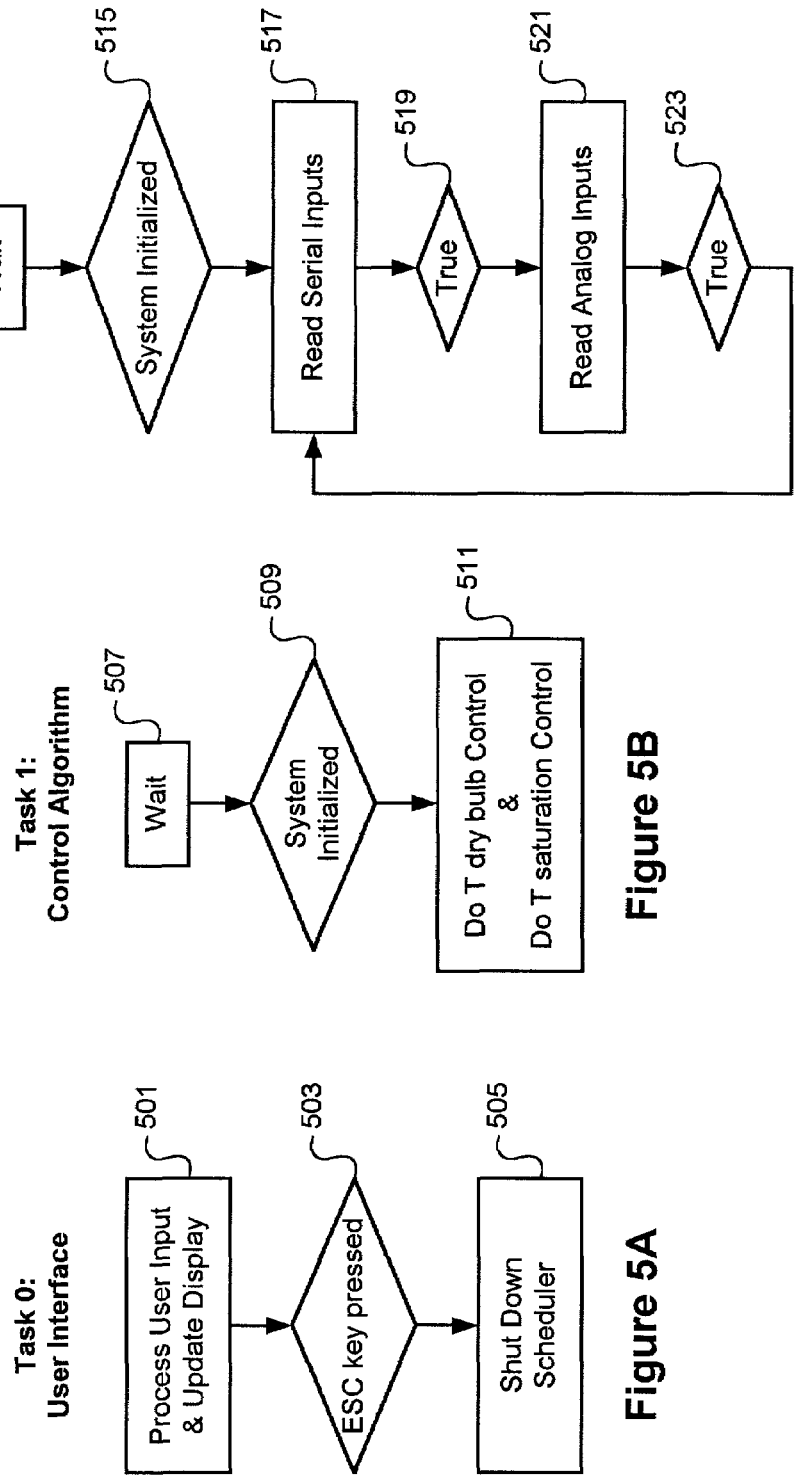

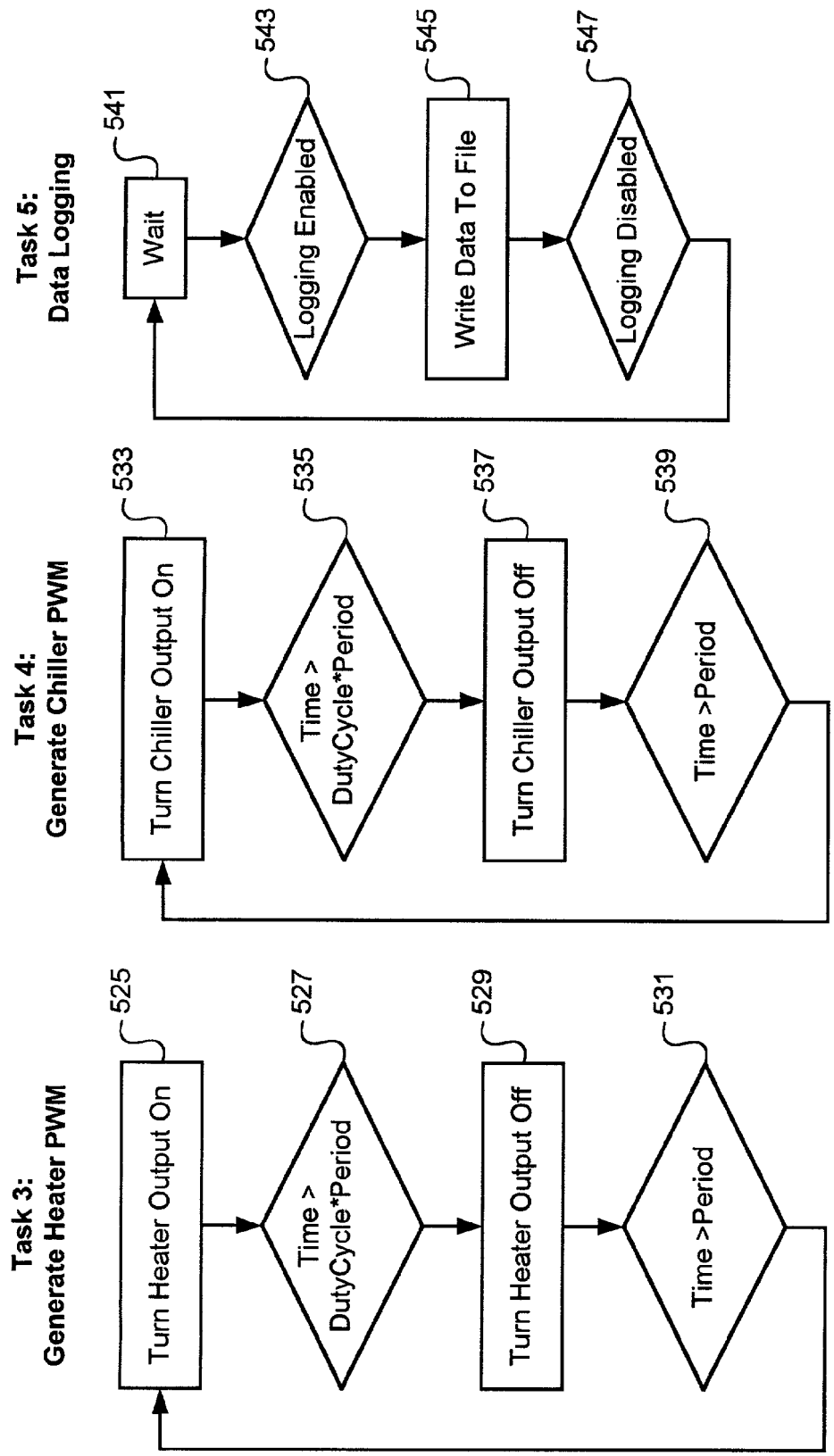

SYSTEMS AND METHODS FOR CONTROLLING LOCAL ENVIRONMENT

The present invention relates in general to the control of local environment, and in particular, to systems and methods for controlling the temperature, humidity, and cleanliness of gas such as air delivered to semiconductor equipment.

BACKGROUND OF THE INVENTION

There are many applications in semiconductor manufacturing where tight control of temperature, relative humidity, and particles of a process gas such as air becomes critical. See Chang & Sze, *ULSI Technology* (1996), which is hereby incorporated by reference.

Foundries, including metrology, lithography, and track areas where photoresist and developer is applied to silicon wafers, may require air having a relative humidity of 45%±0.5% at 24±0.1 C, while other cleanroom areas may require a relative humidity of 45%±5% at 24±0.5 C. For example, the humidity of air delivered to a photoresist spin station must be controlled because it affects the evaporation rate of solvent of the resist. To avoid particle contamination, the process areas may also require Class 1 (at 0.12 microns) while the surrounding areas may only require Class 1000 (at 0.3 microns). The velocity of air is in laminar flow region such as 0.35 m/sec.

Foundries must control other parameters affecting the quality of air, including hydrocarbons and other external contaminants, out-gassing of materials contacting the air, the pressure of the air, and the electrostatic discharge of the system delivering the air to the process.

Because of these requirements, especially for cleanliness, some foundries seek to control the local or mini-environments of critical processes, rather than the entire cleanroom, and transport wafers outside mini-environments in SMIF pods (standard mechanical interfaces). Chang & Sze, at pages 12–13. The mini-environments are cost-effective, but require delivery of precisely controlled gas such as air.

In an air-water system, humidification and dehumidification involves transfer of water between a liquid water phase and a fixed air phase which is insoluble in the water. Heat and mass transfer effects influence one another so that the temperature and relative humidity are coupled together.

The specific humidity is defined as the mass of water vapor carried by a unit mass of dry air. Relative humidity is defined as the ratio of the partial pressure of the water vapor to the vapor pressure of the water at the gas temperature, and is expressed on a percentage basis so that 100 percent relative humidity means saturated air and 0 percent means dry air.

Accurate regulation of temperature and humidity requires use of closed-loop control to compensate for disturbances such as changes in the ambient air conditions. The coupling between temperature and relative humidity presents challenges to the design of the closed-loop controller.

The semiconductor industry has attempted to control the temperature and the relative humidity of process air in three stages: first, a chiller lowers the temperature and humidity of the incoming air below the desired values; second, a heater raises the temperature of the air to a desired value, and, third, a steam source humidifies the air to achieve the required relative humidity. However, boiling water at the steam source is an unstable complex process, and it is difficult to provide controlled boiling that generates the required amount of water vapor to control humidity within the required tolerances ±0.5% RH. Furthermore, the response time of humidity levels resulting from change in the heater power supply is too slow and unpredictable. Because the temperature and relative humidity are coupled and it is difficult to precisely controlling the amount of steam used to humidify the air, this conventional approach has significant drawbacks.

SUMMARY OF THE INVENTION

The present invention provides a robust and cost-effective alternative to the systems used previously because final humidity and temperature can be treated as decoupled parameters.

In a preferred embodiment, a gas-liquid contactor brings liquid into intimate contact with gas so the gas leaves the contactor at the saturation temperature, a heater heats the gas to a desired temperature, and the absolute humidity of the gas is fixed by the inlet liquid temperature to the contactor.

In a preferred embodiment, the system avoids the difficulty of controlling coupled temperature and humidity outputs. In an air-water system, the thermodynamics of moist air dictates the dry bulb and saturation temperatures of the air determine its relative humidity. With the use of steam tables, the problem of controlling temperature and relative humidity can be transformed into one of controlling dry bulb and saturation temperature. Because there is no direct coupling in the control of these parameters, the invention permits precise control of local environments used in the ULSI technology.

BRIEF DESCRIPTION OF THE DRAWINGS

FIG. 3A is a top view of one embodiment of the sprinkler located in the cylindrical housing of the DCCC.

FIG. 3B is a cross-section of a sprinkler arm taken on the line A—A of FIG. 3A.

FIG. 3C is a cross-section of a sprinkler arm taken on the line B—B of FIG. 3B.

FIG. 3D is a perspective view of a sprinkler arm illustrating the direction and spacing of the orifices.

FIG. 3E is cross-section of the sprinkler arm showing its internal structure.

FIGS. 5A–5F are a set of tasks performed by one embodiment of software implementing the present invention.

DETAILED DESCRIPTION OF THE PREFERRED EMBODIMENTS

Figure 1:
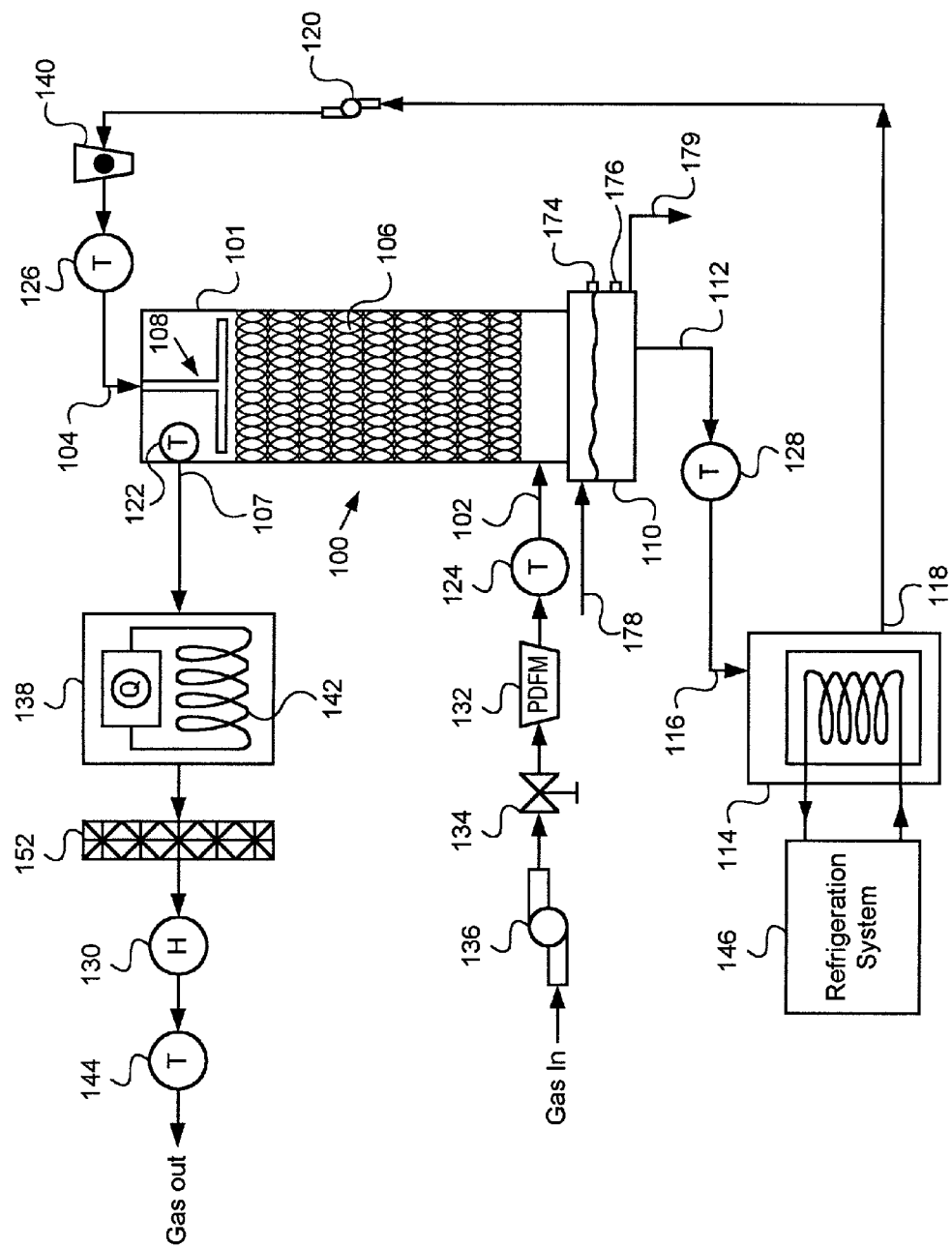
FIG. 1 is a schematic diagram of one embodiment of the system of the present invention.

The present invention relates to a system for controlling the local environment of a gas-liquid system. In a preferred embodiment, the system uses a gas-liquid contactor 100 for humidifying or dehumidifying the gas. As shown in FIG. 1, the gas-liquid contactor 100 includes a housing filled with a contact media 106, a gas inlet 102 below the contact media 106, a gas outlet 107 above the contact media 106, a liquid sprinkler 108 above the contact media 106, and a liquid reservoir 110 below the housing with an outlet 112.

In a preferred embodiment, the gas-liquid contactor 100 is a direct-contact cooler condenser that operates like a cooling tower, but instead the liquid is heated and the gas is cooled. The governing equations and solutions are similar. Cooling tower theory is dealt with by Mills & Irwin, *Heat and Mass Transfer* (1995), which is incorporated by reference.

In a preferred embodiment, the contact media 106 is material with a large surface area/volume of material, chemically inert to the liquid and gas, which brings the liquid and gas into intimate contact for sufficient heat and mass transfer to saturate the gas with the liquid after the contact. Some suitable materials are tower packing, refrigerated coils, and tubes. McCabe & Smith, *Unit Operations* (1976 & later editions) and *Perry's Handbook of Chemical Engineering* (1973 & later editions) provide suitable contact media and are incorporated by reference.

Conventional cooling tower packing typically has large hydraulic diameters in order to reduce pressure drop, but if there is little space, compactness of the DCCC 100 may be more important than avoiding greater than typical pressure drop. Whatever tower packing is selected, it clearly is preferably to have a large surface area per volume.

The liquid from the outlet 112 enters an inlet 116 of a heat exchanger 114 connected to a refrigeration system 146. The chiller, including the refrigeration system 146 and the heat exchanger 114, chills the liquid. The liquid returns from outlet 118 to a pump 120, moves through the flowmeter 140, and enters the gas-liquid contactor 100 at the inlet 104 to the sprinkler 108 forming a closed-loop circulation.

Closed-loop circulation is preferred because the liquid temperature does not deviate as much and can be more quickly returned to operating conditions by the chiller. Further, closed-loop circulation lowers the expense of purifying water, but even so humidification requires make-up and dehumidification removal. Thus, in the preferred embodiment, the system provides a make-up inlet 178 and a removal outlet 179 at the reservoir 110, and high and low reservoir sensors 174, 176 indicating when removal or make-up liquid is required. A suitable high and low sensor is the NCG Multipoint Level Switch made by Kobold Instruments, Inc.

A percentage of the liquid in the "closed-loop" is preferably refreshed to meet the purity requirements. The capacity of the chiller to bring the liquid to operating conditions and the cost of purification sets the appropriate percentage of liquid to add to the "closed-loop" through the make-up inlet 178. A preferred percentage might be 50% of the circulating liquid per hour.

It is preferred that the sprinkler 108 distribute liquid uniformly over the contact media 106. In one embodiment, the system includes temperature sensors 128 and 126 to measure the temperature of the liquid entering and leaving the heat exchanger 114, but the system may in another embodiment include only the gas temperature sensors 122 and 144 for control.

In the embodiment of FIG. 1, a blower 136 moves the gas to a valve 134, a positive flow displacement meter (PDFM) 132, and a gas inlet 102 below the contact media 106.

Figure 2:
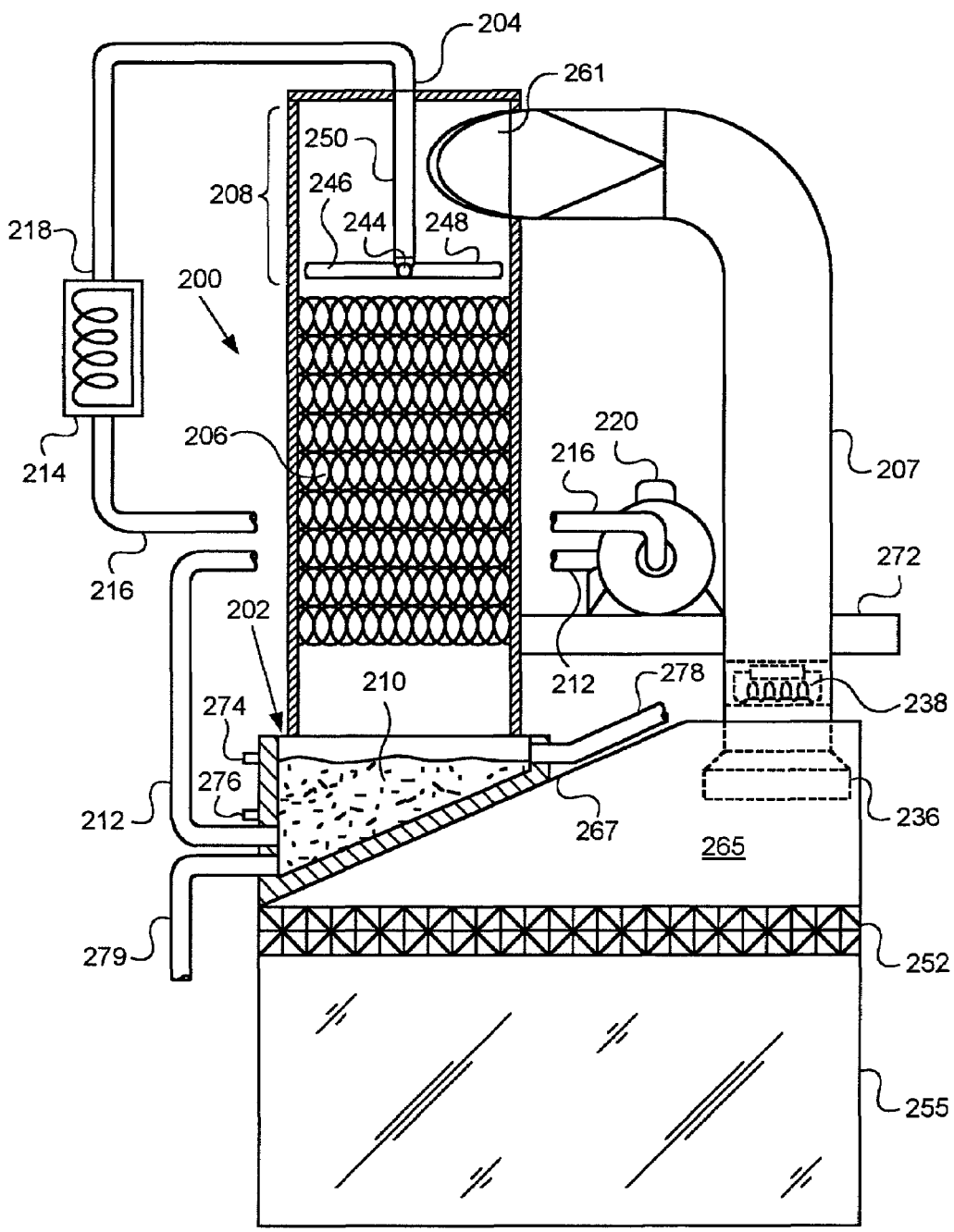
FIG. 2 illustrates an embodiment of the Direct Contact Cooler-Condenser (DCCC) suitable for use in an air-water system.

In another embodiment shown in FIG. 2, the gas enters inlet 202 from the surroundings, the blower 236 is placed downstream of the contactor and valve 134 and flowmeter 132 are not used.

In the preferred embodiment, the gas travels up through the contact media 106 countercurrent to liquid flowing down. However, it is not strictly necessary to have countercurrent flow because any gas-liquid contact achieving the saturated gas at the outlet is satisfactory. After contacting the liquid, the gas leaves at outlet 107 saturated with vapor and goes to a heater 138 with a heater coil 142 where the gas temperature increases to a desired value. A suitable heating coil 142 is a Watlow Gordon 1/16 inch diameter cable heater arranged in a snake-like pattern in two layers to form a heating grid. As shown in FIG. 1, the system includes the gas temperature sensors 124 and 122 to measure the gas entering and leaving the gas-liquid contactor 100.

Thus, the preferred embodiments include two stages. In the first stage, the gas passes through contact media where it is cooled and humidified or dehumidified by direct contact with the flow of chilled liquid. In this stage, it is important that there is sufficient contact media surface area per unit volume to bring the gas and the chilled liquid to thermal equilibrium at full saturation by heating the liquid and cooling the gas. In the second stage, the gas is heated to the desired dry-bulb temperature maintaining its specific humidity unchanged, at which the desired relative humidity is achieved because the desired specific humidity was achieved in the first stage. From the desired relative humidity and dry-bulb temperature, one can extract the corresponding specific humidity and its saturation temperature. Saturation temperature can be controlled by controlling the temperature of the liquid independently from the dry bulb temperature. Similarly, controlling the temperature of the gas in second stage will not impact the specific humidity achieved in the first stage. Note the leading digit of the part numbers indicates the Figure showing the part in question, while the trailing digits indicate like parts are involved. Thus, contact media 106 and 206, shown in FIG. 1 and FIG. 2, respectively, have the same function.

FIG. 2 illustrates a Direct Contact Cooler-Condenser (DCCC) 200 suitable for an air-water system. The DCCC 200 preferably includes a cylindrical-shaped housing, an air inlet 202, a distributing air space at the bottom of the housing, a water inlet 204 and a sprinkler 208 at the top, a reservoir 210 with a water outlet 212 near the bottom, a removal outlet 279 below that, a make-up inlet 278 at the top of the reservoir 210, and a contact media 206, such as the tower packing mentioned earlier. The housing of the DCCC 200 is preferably chemically inert, not off-gassing or exceeding hydrocarbon limits in operation. In one preferred embodiment, the internal diameter of the housing of the DCCC 200 is 12 inches in diameter and 24 inches in height. The water lines are preferably an inert tough material such as ½ inch in diameter Teflon tubing. The inner wall of the reservoir 210 is larger in diameter than the outer wall of the DCCC 200 forming an inlet 202 around the circumference of the DCCC 200 to allow uniform airflow into the tower. The contact media 206 is tower packing 18 inches in height, leaving an open space above of 6 inches. The tower packing is chemically inert, not off-gassing, and contains adequate passages to avoid excessive liquid holdup or pressure drop. Some suitable tower packings for air-water are tower packing media CF650 made by Brentwood Industries, Inc.; black oxidized copper wire cloth; cloth of anodized aluminum wire, or Teflon filaments.

If the contact media 206 is tower packing, it may be held by supporting screens (not shown) or held in place by friction of the tower packing against the walls of the tower. Preferably, the tower packing has sufficient surface area per unit volume to provide good contact between the water and the air for high heat and mass transfer rates; and to bring the air and the water into intimate contact necessary to achieve thermal equilibrium in a single pass whether parallel or countercurrent flow.

As shown in FIG. 2, a non-corrosive chemically compatible pump 220, sitting on support 272, withdraws water from the reservoir 210 through the line 212 and moves the water through line 216 to a heat exchanger 214.

One suitable heat exchanger 214 includes a matrix of approximately 100 TECs (thermal electric chips) sandwiched between two copper plates such that the cold side of the TECs face the same plate and the hot side of the TECs face the another plate. Copper tubing with snake-like pattern is brazed on the opposite surface of the copper plate that is in contact with the cold surfaces of the TECs. Water delivered to the DCCC 200 circulates through the copper tubing. Another copper tubing with snake-like pattern is brazed on the opposite surface of the copper plate that is in contact with the hot surfaces of the TECs. Separate water runs through this tubing to extract the heat from the TECs. The heat exchanger can be remote if desired from the minienvironment to avoid any disturbances. A suitable TEC is part no. CP 2.8-32-06L made by Melcor Materials Electronic Products Corp.

The chilled water leaving the heat exchanger 214 at the outlet 218 is delivered through the line 204 to the sprinkler 208 which distributes the water on the contact media 206. It is important to introduce the water on the contact media 206 so as not to generate mist, or water particulates. It is also preferred not to have any liquid water phase in the air departing the DCCC 200. The air should carry water in its vapor-phase only.

The sprinkler 208 has a set of sprinkler arms 244, 246, and 248, attached to a hub 250 capable of free rotation, and preferably, parallel and close to the contact media 206 such as one inch or closer, and about four inches or more below a gas outlet 207. The relative spacing and the direction of the orifices 399 (FIG. 3) help to prevent entrainment of mist in the air outlet 261. Thus, the air leaves at the outlet 261 saturated and free from water particulates.

An example of a suitable environment for the embodiment of FIG. 2, is an air-water system with the following conditions:

Ambient air temperature: 18–25 C
Maximum rate of temperature change: ±3 C/hour
Ambient relative humidity: 35–50% RH
Maximum rate of relative humidity change: ±5% RH/hour
Maximum static pressure at output: 1 inch of water
Temperature control range: 18–24 C±0.1 C
Relative humidity: 35 to 50% RH±0.5%
Maximum air capacity: 150 CFM FIG. 3A is a top view of one embodiment of the rotatable sprinkler 308 in the cylindrical tower of the DCCC. As shown, in this embodiment, the sprinkler arms 344, 346, and 348 attached to a hub 350 are 120 degrees from each other and the outer tips of the arms are preferably close, e.g., ⅛ inch from the tower walls 385. This arrangement when combined with the rotation of the arms promotes uniform distribution of the liquid on the tower packing in the cylindrical tower (FIGS. 1–2). It is recognized that other arrangements and number(s) of sprinkler arms, such as one or more, e.g., four arms in a cross pattern would be also suitable to achieve uniform liquid distribution. Further, it is not necessary that the "sprinkler" rotate as it might be a non-rotating shower head, e.g., shaped like a disk whose major surfaces are parallel to the contact media.

FIG. 3B is a cross-section of the sprinkler arm 344 taken on line A—A of FIG. 3A. As shown in FIG. 3B, an orifice 399 is angled downward, not down or sideways, but between, for the following reasons. If the orifice points straight down at the contact media it will reduce the mist entrainment in the outlet gas, but will exert no component of rotational force on the sprinkler. If, however, the orifices 399 are at an angle as shown in FIGS. 3B, 3D, and 3E, the mist entrainment can be prevented, plus the component of reactive force directed about the hub can exert rotational force to the sprinkler arm such that the sprinkler distributes the liquid uniformly over the contact media without the need for a separate motor.

FIG. 3C is a cross-section of a sprinkler arm 344 taken on line B—B of FIG. 3B, showing the tightly spaced orifices 399 which enhance the uniform distribution of the liquid on the contact media.

FIG. 3D is a perspective view of the sprinkler arm 344 illustrating the direction and spacing of the orifices 399. In a preferred embodiment, the sprinkler 308 has a plurality of tightly space orifices 399, e.g., each ⅛ inch apart and 0.050 inches in diameter.

FIG. 3E is a cross-section of the sprinkler arm 344 showing its internal structure, including the common passage in the arm 344 for each of the orifices 399.

Referring again to FIG. 2, the gas leaving at the outlet 261 enters a duct 207. The air in the duct 207 travels to a heater 238 close to the exit of the duct 207. The heater 238 raises the air temperature to a desired value. The air is pulled into a blower 236, leaves duct 207 and enters a diffuser box 265, which has a sloped wall 267 such that the air exiting from the diffuser box 267 through a filter 252 is uniformly distributed on the process below the hood 255.

Suitable filters for use in an air-water system include a HEPA filter with the required efficiency, or an ULPA (Ultra Low Penetration Air) filter having an efficiency of 99.9995% or more for particulate diameters greater than 0.12 microns or another high efficiency air filter.

The objective of the control system is to regulate the temperature and the relative humidity of the gas to user-defined set points, the desired values required by the process, and to adjust for disturbances to the system such as changes in the temperature of the gas from the cleanroom or another supply source.

The control systems are now discussed. In the first embodiment, a user sitting a computer 464 such as an IBM compatible computer with software described below and a conventional analog-to-digital (A/D) converter such as the AT-MIO-16DE-10 from National Instruments, which includes software, enters desired values for T set point and RH set point, by the keyboard and display monitor. As shown in FIG. 1, the temperature sensors 122 and 144 measure T saturation and T dry bulb of the gas and output analog feedback signals proportional to the temperatures to the analog-to-digital (A/D) converter associated with the computer 464.

In one embodiment, the dry bulb temperature and relative humidity have been measured after the heater 138 and filter 152 with a combined temperature and humidity sensor 144 and 130 such as the HMP233 from Vaisala, Inc. This combined sensor 144 and 130 is preferably placed approximately 6 inches downstream of the filter 152 outlet. Although a relative humidity feedback signal is not used in the control, it is entered into the computer 464 for monitoring purposes. T saturation of the gas out shown in FIG. 1 is determined indirectly by measuring the temperature of the saturated gas leaving the contactor 100 by temperature sensor 122 located just inside the gas-liquid contactor 100. One suitable temperature sensor is a resistive-temperature-device (RTD) such as the Style RB from Watlow Gordon.

Figure 4:
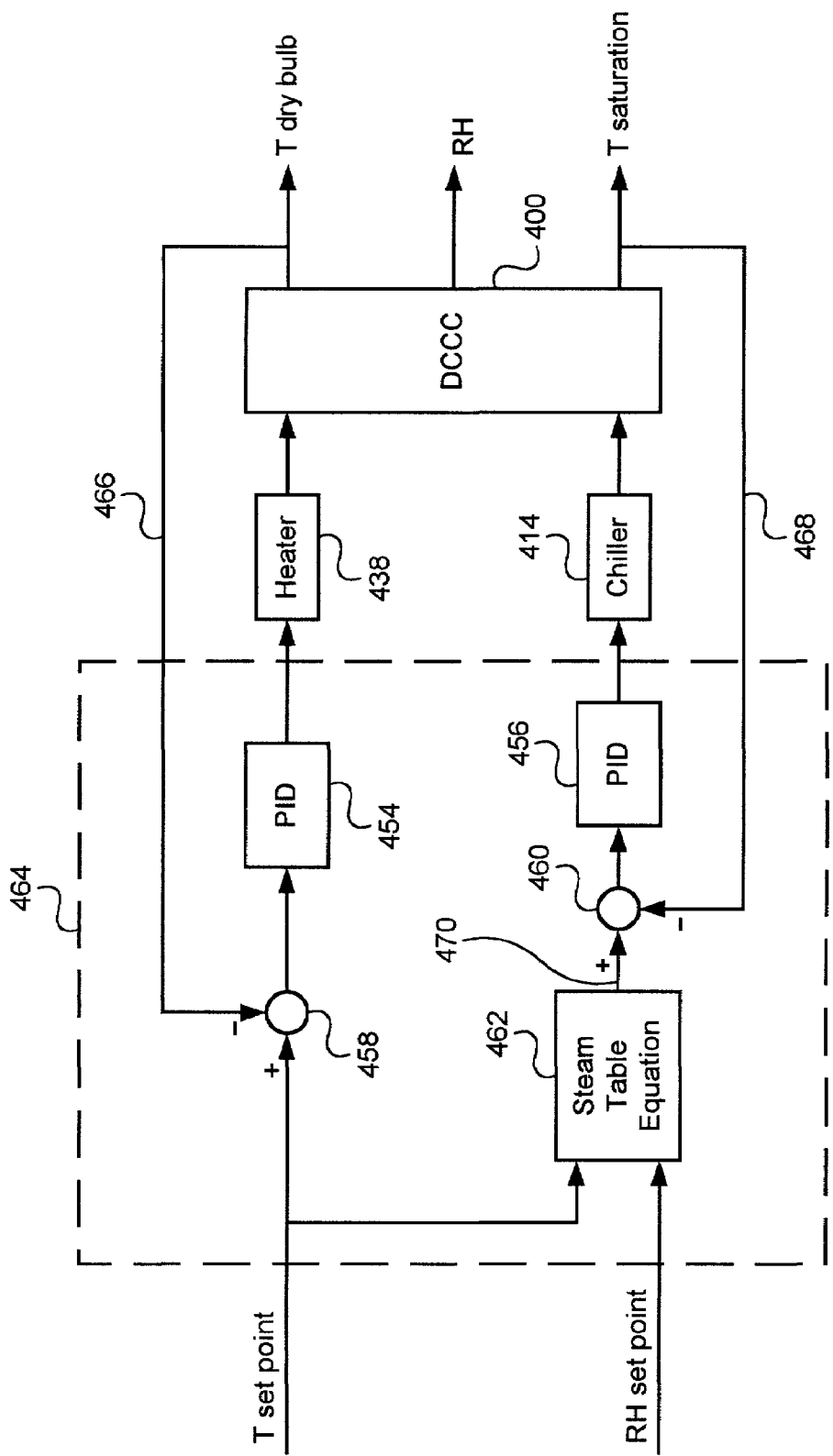
FIG. 4 illustrates an embodiment of the control system suitable for use with the present invention.

FIG. 4 illustrates the first embodiment of the control system suitable for use with the present invention. As shown in FIG. 4, in the first embodiment, the control system includes an algorithm consisting of two feedback loops 466, 468, and a feedforward element 462 which transforms the T set point and RH set point into a corresponding saturation temperature set point 470 sent to comparator 460. The comparator 460 takes the difference between set point 470 and the feedback signal 468, and outputs an error signal to a proportional-integral-derivative (PID) compensator 456 which in turn outputs a command signal to the chiller 414 to adjust its cooling rate. As is known, a PID takes the error signal: (1) multiplies it by a first constant; (2) integrates the error signal, and multiplies it by a second constant; and (3) takes the error signal's derivative, multiplies it by a third constant, and sums (1), (2), and (3), which provides accurate and responsive control over a wide range of conditions. See Weber, *An Introduction to Process Dynamics and Control* (1973) which discusses PID controllers in more detail, and is hereby incorporated by reference. Similarly, the comparator 458 takes the difference between T set point and feedback signal 466 and outputs an error signal to a PID compensator 454, which outputs a command signal to the heater 438 to adjust its heating rate.

In one embodiment, the transformation to the saturation temperature set point 470 is achieved by use of empirical 'steam table' equations, which can be found in texts such as Irvine & Liley, Steam and Gas Tables with Computer Equations, Academic Press, 1984, which is hereby incorporated by reference. The two feedback loops 466, 468, regulate the T dry bulb and T saturation of the outlet gas, while the feedforward 462 ensures T dry bulb and T saturation yield the desired relative humidity RH set point defined by the user.

One embodiment of real-time control software written in the C language is shown in the program listing below. The software includes a cooperative multitasking scheduler that executes six tasks. In a cooperative multitasking environment, the scheduler allocates use of the CPU to each of tasks so each task is given processing time and passes back control to scheduler after completion of the task. Each task is divided into states which execute in a short time period, so no single task monopolizes the CPU, and the tasks appear to be performed simultaneously. The software architecture is preferably simple to facilitate migration from a PC to an advanced microcontroller such as the Microchip PIC17C756 by Microchip Technology, Inc. since all required hardware and software can be contained in a compact package.

FIGS. 5A–5F show six tasks in state transition logic form performed by one embodiment of software implementing the present invention:

Task 0 maintains a simple user interface for entering the T and RH set points and displaying T dry bulb, RH, and T saturation on the computer monitor and permitting shut down of the scheduler if the user presses the escape key on the computer. This turns off the chiller 414 and heater 438 and exits the control software.

Task 1 includes a wait state 507 to initialize the system, including establishing communication with the sensors 144 and 130 before initiating control. After the system is initialized 509, Task 1 moves into control state 511 where Task 1 executes the algorithm described in connection with FIG. 4, including feedforward 462 and feedback loops 466, 468.

Task 2 also includes a wait state 513 for the same reasons as for wait state 507. In this embodiment, temperature and humidity sensors 144 and 130 generate serial data so Task 2 must acquire both serial data and the analog signals of sensor 122. The preferred embodiment use only analog sensors because this provides faster sensor response and simplifies the code needed in Task 2.

Tasks 3 and 4 convert the outputs from heater PID 454 and chiller PID 456 shown in FIG. 4 into pulse-width-modulated (PWM) signals. Horowitz & Hill, *The Art of Electronics* (1989) describes PWM signals and is incorporated by reference. The PWM signals permit the heater 438 and chiller 414 to interface to the computer 464 by conventional solid state relays appropriate for the heater 438 and the chiller 414 selected such as those readily available from Continental Industries, Inc. or any appropriate power switching device. Considerations for selecting solid state relays for the heater and chiller are AC versus DC, maximum voltage, maximum current, and switching speed. The PWM signals have been generated in software, but a more appropriate method would be to use a microcontroller with built-in PWM hardware.

Task 5 includes wait state 541 until the user at the computer 464 presses an appropriate key to enable the logging of data, T dry bulb, RH, and T saturation. Once logging is enabled, Task 5 moves to states 545 where it continuously writes the data to the computer hard disk. Another key press disables the logging and Task 5 moves back to the wait state. Whether control is implemented on a PC or a microcontroller, it is not necessary to have Task 5.

As mentioned previously, the microcontroller embodiment may be preferable to replace the personal computer to reduce cost and size. The user interface could be reduced to a LCD screen and push buttons. The computational requirements of the algorithm have been kept low enough to be performed by inexpensive microcontroller such as the Microchip Technology's part no. PIC17C756.

Figure 6:
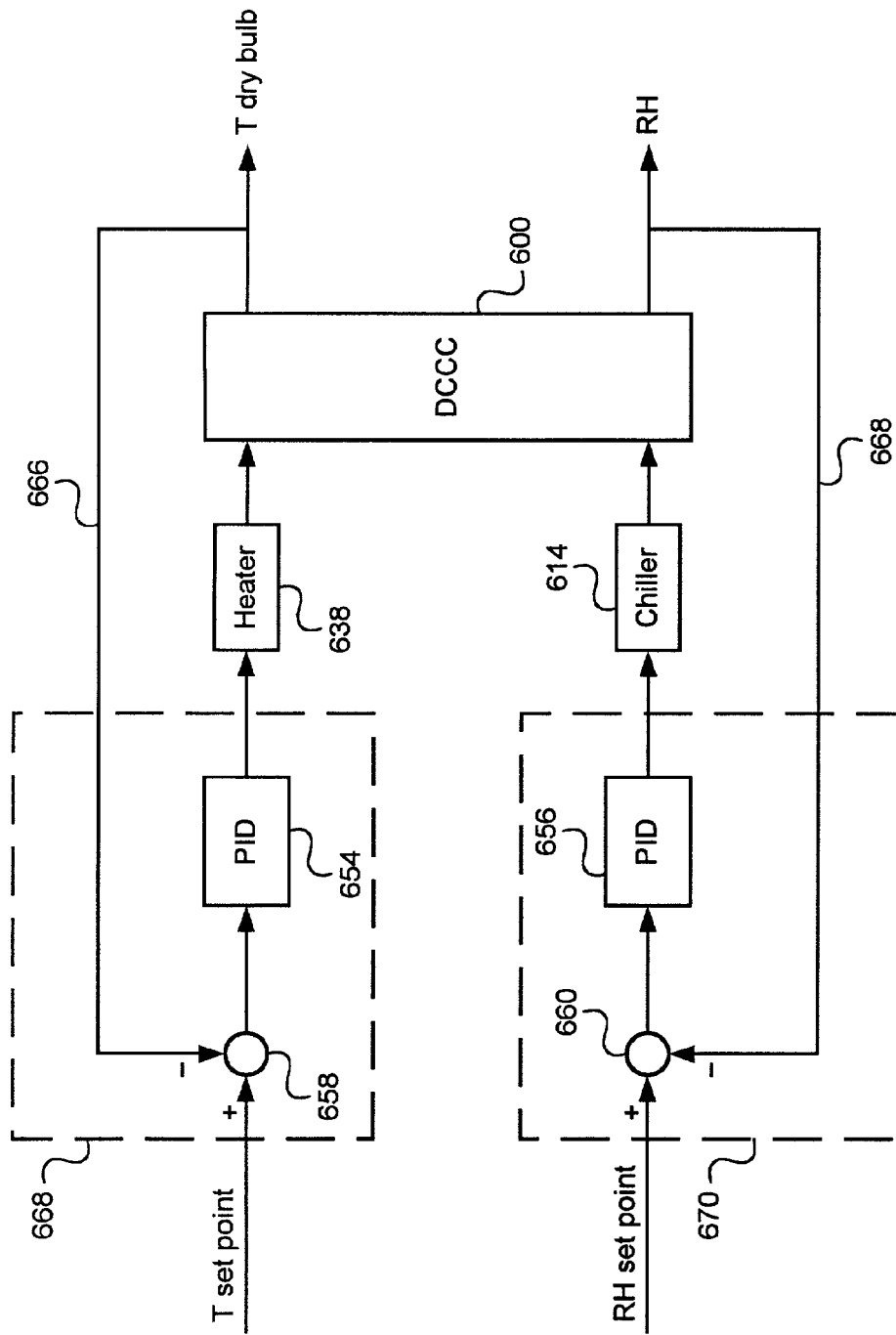
FIG. 6 illustrates an alternative embodiment of the control system.

FIG. 6 illustrates a second embodiment of control system suitable for use with the present invention. In this embodiment, the system controls T dry bulb and RH with two independent feedback loops 666 and 668. A controller 668 and 670 implement the comparators 658, 660, the compensation of PID 654 and 656, and PWM signals driving the heater 638 and chiller 614. Honeywell IAC Division makes suitable single-loop controllers such as the UDC1000 controller. Since this control system does not compensate for the coupling of the temperature and relative humidity, it is likely to have decreased stability. The advantage of the second embodiment is that it can be readily constructed using commercially available components.

The same type of temperature/humidity sensor discussed in the first embodiment can be used. The controllers 668 and 670 contain simple functions for setting the set points and reading the temperature and humidity sensor. T saturation temperature is not used and need not be measured. The outputs of the controllers 668 and 670 are PWM signals which interface with the heater 638 and the chiller 614 as described in the first embodiment.

Figure 7:
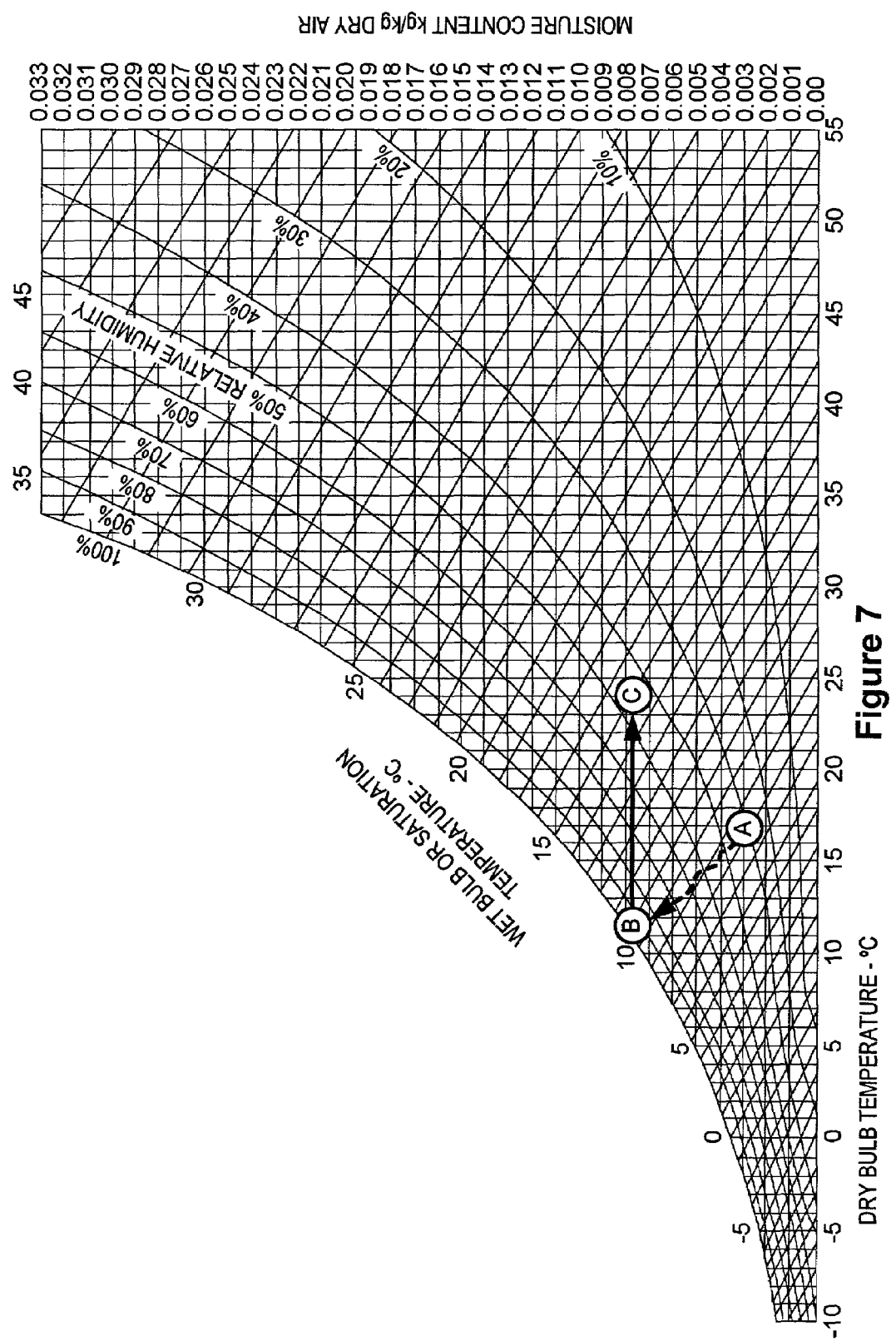
FIG. 7 is a psychrometric chart showing a process path for humidifying air in the system of the present invention.

FIG. 7, a psychrometric chart, shows humification and relates dry bulb temperature of air (abscissa) to specific humidity (ordinate) and % relative humidity. As shown in FIGS. 2 and 7, the air entering inlet 202 of the DCCC 200 has a relative humidity of 30% at an initial dry bulb temperature of 17 C. This is point A shown in FIG. 7. As discussed earlier, the air travels through the DCCC 200, loses sensible heat, and gains vapor from the water contacting it until the air is fully saturated. The air leaves the DCCC 200 at outlet 207 at T saturation. This is point B shown in FIG. 7. The wavy dotted line from A to B indicates that the actual temperature-humidity path is not known, nor is it necessary as long as air leaves the DCCC 200 at outlet 207 at T saturation, that is, point B. Next, the heater 238 heats the outlet air from the DCCC 200 to the desired dry bulb temperature T dry bulb and relative humidity RH shown as point C in FIG. 7, which corresponds to T dry bulb and T saturation shown in the control diagram of FIG. 4.

Figure 8:
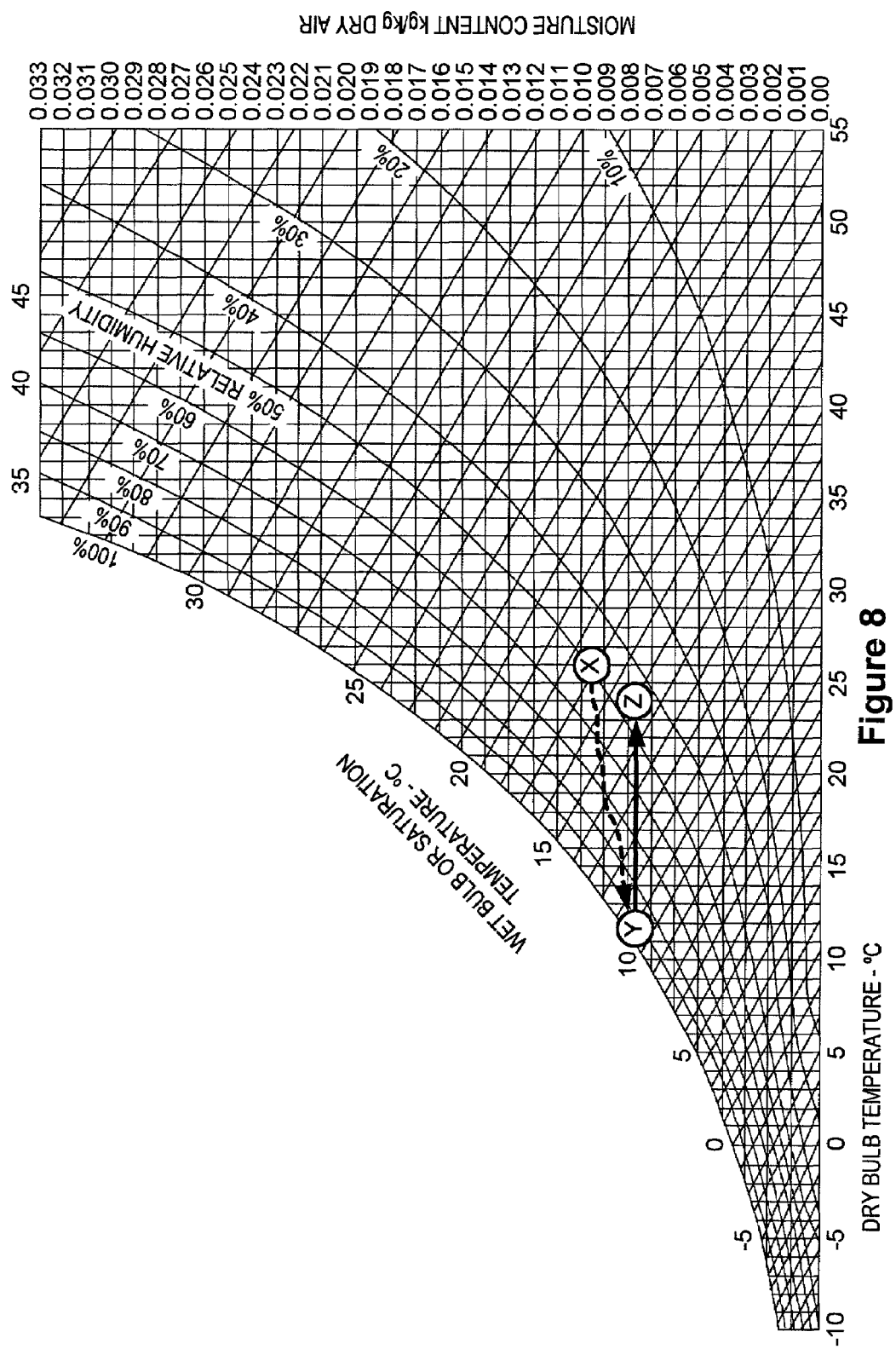
FIG. 8 is a psychrometric chart showing a process path for dehumidifying air in the system of the present invention.

FIG. 8, a psychrometric chart, shows dehumidification of air in a system of the present invention. As shown in FIGS. 2 and 8, the air entering inlet 202 of the DCCC 200 has a relative humidity of 50% at a dry bulb temperature of 26 C. This is point X shown in FIG. 8. As discussed earlier, the inlet air travels through the DCCC 200, loses sensible heat, and gains vapor from the water contacting it until the air is fully saturated. The air leaves DCCC 200 at outlet 207 at temperature, T saturation. This is point Y shown in FIG. 8. The wavy dotted line from X to Y indicates that the actual temperature humidity path is not known, nor is it necessary as long as the air leaves at outlet 207 at T saturation, that is, point B. Next, the heater 238 shown in FIG. 1 heats the outlet air from the DCCC 200 to the desired dry bulb temperature T dry bulb and relative humidity RH, that is, point Z shown in FIG. 8. It should be noted that point Z also corresponds to T dry bulb and T saturation shown in FIG. 4.

Figure 9:
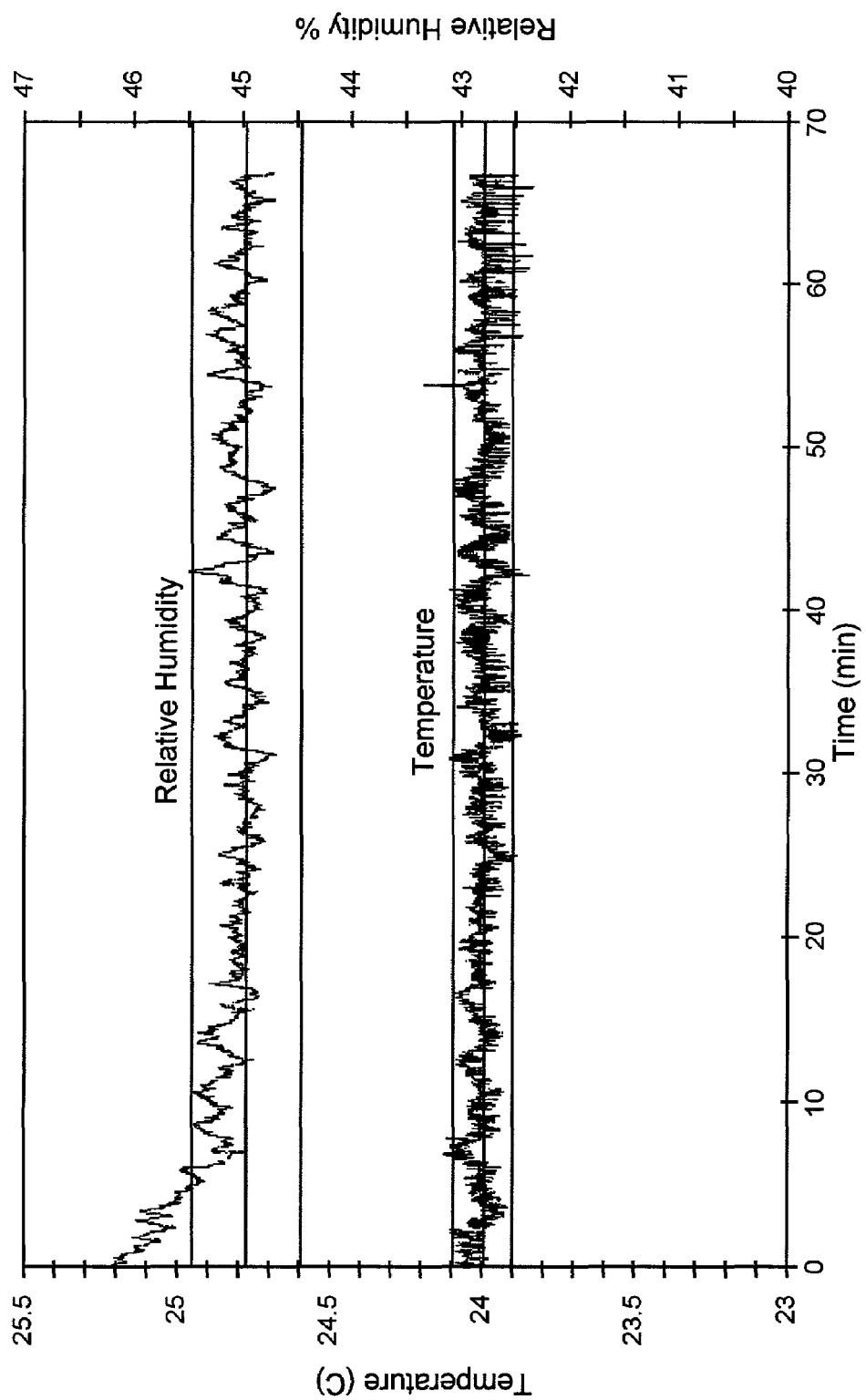
FIG. 9 is a graph illustrating the results of decoupling relative humidity from temperature.

FIG. 9 is a graph illustrating the results of decoupling relative humidity from temperature of air in the embodiment shown in FIG. 2. As shown in FIG. 9, the user defines RH set point and T set point (see FIGS. 4 and 6) and tolerances of the air at a relative humidity of 45%±0.5% at 24±0.1 C. Although T dry bulb, the actual temperature of the air delivered at t=0 meets the user requirements, the actual relative humidity of air, RH, is 46%, and therefore fails to meet requirements. After less than about 10 minutes of control, however, the system brings relative humidity, RH, of the air within the tolerances established by the user. The temperature-humidity path of the air shown in FIG. 9 is the logged data obtained by execution of Task 5 of the software computer or microcontroller shown in FIG. 5.

```
/*******************************************************************
File: Sched.c
            Bryan Wade
Sched is a cooperative multi-tasking scheduler-dispatcher.
Tasks are in the form of state transition logic. Task states are
entered in the file Tasks.c and scheduling info is entered in this
file.
*******************************************************************/
#include <stdio.h>
#include <conio.h>
#include <time.h>
#include <dos.h>
#include "sched.h"
#include "tasks.h"
#include "milliclk.h"
//begin: scheduler info//////////////////////////////////////////////
#define NUM_TASKS 6
#define STACK_MAX 2*NUM_TASKS
struct taskStruct task[NUM_TASKS]={
/*Tsamp    timeLeft    nextState      priority      timeSinceLast*/
{100,      0,
                       task0state0,    5
,0                                                   },
{200,      0,
                       task1state0,    4
,0                                                   },
{250,      0,
                       task2state0,    3
,0                                                   },
{1,        0,
                       task3state0,    2
,0                                                   },
{1,        0,
                       task4state0,    1
,0                                                   },
{2000,     0,                                        task5state0,
           6
,0                                                   }
};
//end: scheduler info////////////////////////////////////////////////
int StopFlag=0;
int main(void){
            int dt;
            int i;
            int stack[STACK_MAX];
            int stackIndex=EMPTY;
            int fgQueue[NUM_TASKS];
            int bgQueue[NUM_TASKS];
            int bgIndex=0;
            int numFG;
            int numBG;
```

-continued

```
            unsigned long taskCount[NUM_TASKS];
            unsigned long passes=0;
            unsigned long startTime;
            fillQueues(fgQueue, &numFG, bgQueue, &numBG,
taskCount);
      initializationTask( );
            startTime = 0;
            SetupMilliClock( );
            while (!StopFlag){
            //update time stuff
            dt = MilliClock(0);
            passes++;
            for (i=0;i<NUM_TASKS;i++){
                    task[i].timeSinceLast += dt;
            }
            //add states to the stack in order of priority
            if (stackIndex >= STACK_MAX) {
                    StopScheduling(STACK_STOP);
                    break;
            }
            for(i=0;i<numFG;i++){
                    task[fgQueue[i]].timeLeft -= dt;
                            if (task[fgQueue[i]].timeLeft
<= 0){
            stack[++stackIndex]=fgQueue[i];
            task[fgQueue[i]].timeLeft = task[fgQueue[i]].Tsamp;
                            }
                }
            //process the stack
            if (stackIndex!=EMPTY){
                    //run the task at the top of the stack
                    (*(task[stack[0]].nextState))( );
                    task[stack[0]].timeSinceLast = 0;
                    taskCount[stack[0]]++;
                    //update the queue
                    for (i=0;i<stackIndex;i++{
                            stack[i]=stack[i+1];
                    }
                    stackIndex--;
            }else{
                    //run background task
                    if (numBG>0) {
            (*(task[bgQueue[bgIndex]].nextState))( );
            task[bgQueue[bgIndex]].timeSinceLast = 0;
            taskCount[bgQueue[bgIndex]]++;
                                bgIndex =
(bgIndex==numBG-1) ? 0 : bgIndex+1;
                    }
                }
            }
shutdownScheduler(startTime,passes,taskCount,stackIndex);
            shutdownTask( );
return 0;
}
////////////////////////////////////////////////////////
void fillQueues(int* fgQueue,int* numFG,int* bgQueue,int*
numBG,
            unsigned long * taskCount) {
            int i,p;
            int bg=0;
            int fg=0;
            //load the Queues
            for (i=0; i<NUM_TASKS; i++){
                    p=task[i].priority;
                    if (p==0) {
                                bgQueue[bg] = i;
                                bg++;
                    }else{
                                fgQueue[p-1] = i;
                                fg++;
                    }
                    taskCount[i]=0;
            {
            *numBG=bg;
            *numFG=fg;
return;
}
```

-continued

```
////////////////////////////////////////////////////////////
void shutdownScheduler(unsigned long startTime, unsigned
long passes,
                      unsigned long* taskCount, int
stackIndex){
        float elapsedTime;
        int i;
        char buffer[20];
        startTime=0;
        elapsedTime=(float)((clock( )−startTime)/CLK_TCK);
        switch (StopFlag){
                case USER_STOP:
        sprintf(buffer,"User Requested"); break;
                case STACK_STOP:
        sprintf(buffer,"Task Stack Full"); break;
                case FILE_STOP:
        sprintf(buffer,"File Error"; break;
                case COMM_STOP:
        sprintf(buffer,"Communication Error");break;
        }
        clrscr( );
        printf("\n\n\f\t****************************************\n");
        printf("\t\t Scheduler Shutdown: %s \n",buffer);
        printf("\t\****************************************\n");
        if (ShutdownMilliClock( ))
                        printf("\t\tTimer ISR terminated
normally.\n\n");
        printf("\t\t****************************************\n");
        printf("\t\t   Scheduling Statistics   \n");
        printf("\t\t****************************************\n");
        printf("\t\tElapsed Time:
%8.3f\n",elapsedTime);
                printf("\t\tScheduler Avg Scan Time:
%8.3f\n",elapsedTime*1000/((float)passes+EPS));
        for (i=0;i<NUM_TASKS;i++){
                        printf("\t\tTask%d Avg Sample Time:
%8.3f\n",i,
                elapsedTime*1000/((float)(taskCount[i])+EPS));
        }
                printf("\t\tTasks Currently in Stack:
%d\n",stackIndex+1);
}
////////////////////////////////////////////////////////////
void StopScheduling(int stopType){
        StopFlag=stopType;
}
/***********************************************************
File: Tasks.c
                                        Bryan Wade
Tasks is the file where tasks are entered for Sched. Tasks are
in the form
of state transition logic. Each state is a function which contains
ENTRY,
ACTION and EXIT sections along with other info for the
scheduler. Any datawhich needs to be shared between tasks is
defined as a global variable.
Task0 - User Interface
Task1 - Control Algorithm
Task2 - Read Sensors
Task3 - Air Heater PWM
Task4 - Water Chiller PWM
Task5 - Data Collection
******************************/
#include <stdio.h>
#include <dos.h>
#include <math.h>
#include "sched.h"
#include "tasks.h"
#include "lpt_io.h"
#include "screen.h"
#include "thc_fcns.h"
/*The following 2 files contain code the National Instruments
data aquistion board. The files are obtained from National
Instruments.*/
#include "nidaq.h"
#include "nidaqcns.h"
#define CR 0x0D
```

-continued

```
//begin: task1 global vars////////////////////////////////////////
#define KPTAIR .32
#define KITAIR .0015
#define KDTAIR 0.01
#define TAIR_ILIM .3
#define KFHEAT1 0.048
#define KFHEAT2 −0.341
#define KFHEAT3 6.710
float TairSetpoint=24;
float TairError=0;
float TairErrorInt=0;
float TairZeroInt =0;
float TairErrorDeriv=0;
float TairErrorPrev=0;
float DutyHeaterPredicted=0;
float DutyHeater=0;
#define KPTSAT .45
#define KITSAT .002
#define KDTSAT 0.01
#define TSAT_ILIM .3
#define KFCHILL1 −0.1156
#define KFCHILL2 1.5200
float RHSetpoint=45;
float TsatSetpoint=0;
float TsatError=0;
float TsatErrorInt=0;
float TsatZeroInt =0;
float TsatErrorDeriv=0;
float TsatErrorPrev=0;
float DutyChillerPredicted=0;
float DutyChiller=0;
//begin: task2 global vars////////////////////////////////////////
#define AI_DEVICE 1
#define AI_CHAN      0
#define AI_GAIN      1
#define TSAT_SLOPE 7.888
#define TSAT_INT   −7.500
int value;
double volts;
float TairMeasured=0;
float RHMeasured=0;
float TsatMeasured=0;
int CommInitialized=FALSE;
//begin: task3 global vars////////////////////////////////////////
int OutputHeater=0;
float EnableHeater=0;
float TimerHeater=0;
float TimeOffHeater=0;
float PeriodHeater=400;
//begin: task4 global vars////////////////////////////////////////
int OutputChiller=0;
float EnableChiller=0;
float TimerChiller=0;
float TimeOffChiller=0;
float PeriodChiller=400;
//begin: task5 global vars////////////////////////////////////////
#define MAX_DATA_COUNT 2000
float CollectData=0;
int DataCount=0;
float DataTime=0;
float Data1[MAX_DATA_COUNT];
float Data2[MAX_DATA_COUNT];
float Data3[MAX_DATA_COUNT];
float Data4[MAX_DATA_COUNT];
float Data5[MAX_DATA_COUNT];
float Data6[MAX_DATA_COUNT];
float Data7[MAX_DATA_COUNT];
//begin: task0 global vars////////////////////////////////////////
int escKeyHit=0;
#define NUM_MSG   9
struct ScreenMsg msg[NUM_MSG]={
    {    "Environmental Control Unit",   22,    1},
    {    "OPERATING SETPOINTS",           4,    3},
    {    "CONTROL PARAMETERS",            4,    7},
    {    "OUTPUT PARAMETERS",             4,   12},
    {    "DATA COLLECTION",               4,   19},
    {    "SENSOR READINGS",              47,    3},
    {    "INTERMEDIATE VALUES",          47,    8},
```

```
                              -continued

{       "OUTPUT VALUES",           47,      16},
{       "PRESS [ESC] TO EXIT",     28,      25}
};
#define NUM_IN    9
struct ScreenInputItem inItem[NUM_IN]={
{       "TEMP Setpt",       4,        .05,    0,
        100,        &TairSetpoint},
{       "RH Setpt",         5,        .25,    0,
        100,        &RHSetpoint},
{       "Zero Tdry",        8,        1,      0,
        100,        &TairZeroInt},
{       "Zero Tsat",        9,        1,      0,
        100, &TsatZeroInt},
{       "Enable H", 13,     1,        0,      1,
        &EnableHeater},
{       "Enable C", 14,     1,        0,      1,
        &EnableChiller},
{       "Period H", 16,     10,       10,     5000,
        &PeriodHeater},
{       "Period C", 17,     10,       10,     5000,
        &PeriodChiller},
{       "Enable",           20,       1,      0,
        1,          &CollectData}
};
#define NUM_OUT   11
struct ScreenOutputItem outItem[NUM_OUT]={
{       "RH Meas",          5,NULL,   &RHMeasured},
{       "Tair Meas",4,NULL,  &TairMeasured},
{       "Tsat Meas",6,NULL,  &TsatMeasured},
{       "Tair Intgr",9,NULL, &TairErrorInt},
{       "H Duty *",10,NULL,  &DutyHeaterPredicted},
{       "Tsat Setpt",12,NULL, &TsatSetpoint},
{       "Tsat Intgr",        13,NULL,  &TsatErrorInt},
{       "C Duty * ", 14,NULL, &DutyChillerPredicted},
{       "H Duty",17,NULL,    &DutyHeater},
{       "C Duty",18,NULL,    &DutyChiller},
{       "Data Count",20,    &DataCount,
        NULL}
};
//begin: task0 states//////////////////////////////////////////////
void task0state0( ){ static cont = FALSE;
        if (cont==FALSE){
                cont=TRUE;
                //begin: ENTRY function
                SetupScreen(msg,NUM_MSG,
inItem,NUM_IN, outItem,NUM_OUT,
        &escKeyHit, NULL);
                //end: ENTRY function
        }
        //begin: ACTION function
        DoScreenInput( );
        DoScreenOutput( );
        //end: ACTION function
        if (escKeyHit){
                //begin: EXIT function
                StopScheduling(USER_STOP);
                //end: EXIT function
                cont=FALSE;
                task[0].nextState = task0state0;
        }
        if (ICommInitialized){
                //begin: EXIT function
                StopScheduling(COMM_STOP);
                //end: EXIT FUNCTION
                cont=FALSE;
                task[0].nextState = task0state0;
        }
}
//begin: task1 states//////////////////////////////////////////////
void task1state0( ){ static cont = FALSE;
                if (cont==FALSE){
                cont=TRUE;
                //begin: ENTRY function
                //end: ENTRY function
        }
```

```
            //begin: ACTION function
            //end: ACTION function
            if (CommInitialized){
                    //begin: EXIT function
                    //end: EXIT function
                    cont=FALSE;
                    task[1].nextState = task1state1;
            }
    }
}
void task1state1( ){ static cont = FALSE;
                    if (cont==FALSE){
                    cont=TRUE;
                    //begin: ENTRY function
                    //end: ENTRY function
            }
            //begin: ACTION function
            /// DRY BULB TEMPERATURE CONTROL: PID w/
FF//
                                        /*Compute P term */
            TairError = TairSetpoint-TairMeasured;
                                        /*Compute I term*/
            TairErrorInt +=
TairError*(float)(task[1].timeSinceLast)/1000;
            if (TairZeroInt || fabs(TairError)>TAIR_ILIM){
                    TairErrorInt=0.;
            }
                                        /*Compute D term*/
            TairErrorDeriv = (TairError −
TairErrorPrev)/((float)(task[1].timeSinceLast)/1000);
            TairErrorPrev = TairError;
                                        /*Compute Feedforward*/
            DutyHeaterPredicted = KFHEAT1*(TairSetpoint−
(1.+KFHEAT2)*TsatMeasured−KFHEAT3);
                                        /*Compute Output*/
            DutyHeater = KPTAIR*TairError +
KITAIR*TairErrorInt + KDTAIR*TairErrorDeriv
                                        + DutyHeaterPredicted;
            if (DutyHeater<0) DutyHeater=0.;
            else if (DutyHeater>1.) DutyHeater=1.;
            //////// SAT TEMPERATURE CONTROL: PID w/ FF
///
                                        /*Determine
Tsat Setpoint */
            TsatSetpoint =
Tsat_steamTable(RHSetpoint/100.*Psat_steamTable(TairSetpo
int+273.16))−273.16;
                                        /*Compute P
term*/
            TsatError = TsatSetpoint − TsatMeasured;
                                        /*Compute I term
*/
            TsatErrorInt +=
TsatError*(float)(task[1].timeSinceLast)/1000;
            if (TsatZeroInt || fabs(TsatError)>TSAT_ILIM){
                    TsatErrorInt=0.;
            }
                                        /*Compute D
term */
            TsatErrorDeriv = (TsatError −
TsatErrorPrev)//(float)(task[1].timeSinceLast)/1000);
            TsatErrorPrev = TsatError;
                                        /*Compute
Feedforward */
            DutyChillerPredicted = KFCHILL1*TsatSetpoint +
KFCHILL2;
                                        /*Compute
Output */
            DutyChiller = KPTSAT*TsatError +
KITSAT*TsatErrorInt + KDTSAT*TsatErrorDeriv
                                        + DutyChillerPredicted;
            if (DutyChiller<0) DutyChiller=0.;
            else if (DutyChiller>1.) DutyChiller=1.0;
            //end: ACTION function
```

-continued

```
                    if (FALSE)
                    {
                            //begin: EXIT function
                            //end: EXIT function
                            cont=FALSE;
                            task[1].nextState = task1state1;
                    }
        }
}
//begin: task2 states////////////////////////////////////////////////
void task2state0( ){ static cont = FALSE;
        if (cont==FALSE){
                    cont=TRUE;
                    //begin: ENTRY function
                    //end: ENTRY function
        }
        //begin: ACTION function
        //end: ACTION function
        if (CommInitialized){
                    //begin: EXIT function
                    //end: EXIT function
                    cont=FALSE;
                    task[2].nextState = task2state1;
        }
}
void task2state1( ){ static cont = FALSE;
        if (cont==FALSE){
                    cont=TRUE;
                    //begin: ENTRY function
                    txChar('S');
                    txChar('E');
                    txChar('N');
                    txChar('D');
                    txChar(CR);
                    //end: ENTRY function
        }
        //begin: ACTION function
        //end: ACTION function
        If (TRUE){
                    //begin: EXIT function
                    if
(getHMP230Readings(&RHMeasured,& TairMeasured)) {
                    StopScheduling(COMM_STOP);
                    }
                    //end: EXIT function
                    cont=FALSE;
                    task[2].nextState = task2state2;
        }
}
void task2state2( ){ static cont = FALSE;
        if (cont==FALSE){
                    cont=TRUE;
                    //begin: ENTRY function
                    AI_Clear(AI_DEVICE);
        AI_Read(AI_DEVICE,AI_CHAN,AI_GAIN,&value);
        AI_VScale(AI_DEVICE,AI_CHAN,AI_GAIN,1,0.0,value,
&volts);
                    TsatMeasured = TSAT_SLOPE*volts +
TSAT_INT;
                    //end: ENTRY function
        }
        //begin: ACTION function
        //end: ACTION function
        if (TRUE){
                    //begin: EXIT function
                    //end: EXIT function
                    cont=FALSE;
                    task[2].nextState = task2state1;
        }
}
//begin: task3 states////////////////////////////////////////////////
void task3state0( ){ static cont = FALSE;
        if (cont==FALSE){
                    cont=TRUE;
                    //begin: ENTRY function
                    Pin2lo( );
                    OutputHeater=0;
                    //end: ENTRY function
        }
```

```
                //begin: ACTION function
                //end: ACTION function
                if (EnableHeater==1.){
                        //begin: EXIT function
                        //end: EXIT function
                        cont=FALSE;
                        task[3].nextState = task3state1;
                }
}
void task3state1( ){ static cont = FALSE;
        if (cont=FALSE){
                cont=TRUE;
                //begin: ENTRY function
                TimerHeater=0;
        TimeOffHeater=DutyHeater*PeriodHeater;
                Pin2hi( );
                OutputHeater1;
                //end: ENTRY function
        }
        //begin: ACTION function
        TimerHeater+= (float)task[3].timeSinceLast;
        //end: ACTION function
        If (TimerHeater>TimeOffHeater &&
DutyHeater>=1.){
                //begin: EXIT function
                //end: EXIT function
                cont=FALSE;
                task[3].nextState =task3state1;
        }
        If (TimerHeater>TimeOffHeater && DutyHeater<1.){
                //begin: EXIT function
                //end: EXIT function
                cont=FALSE;
                task[3].nextState = task3state2;
        }
        if (EnableHeater<1){
                //begin: EXIT function
                //end: EXIT function
                cont=FALSE;
                task[3].nextState task3state0;
        }
}
void task3state2( ){ static cont = FALSE;
        if (cont==FALSE){
                cont=TRUE;
                //begin: ENTRY function
                Pin2lo( );
                OutputHeater=0;
                //end: ENTRY function
        }
        //begin: ACTION function
        TimerHeater+= (float)task[3].timeSinceLast;
        //end: ACTION function
        if (TimerHeater>PeriodHeater && DutyHeater<=0){
                //begin: EXIT function
                //end: EXIT function
                cont=FALSE;
                task[3].nextState = task3state2;
        }
        if (TimerHeater>PeriodHeater && DutyHeater>0){
                //begin: EXIT function
                //end: EXIT function
                cont=FALSE;
                task[3].nextState = task3state1;
        }
}
//begin: task4 states////////////////////////////////////////////////
void task4state0( ){ static cont = FALSE;
        if (cont==FALSE){
                cont=TRUE;
                //begin: ENTRY function
                Pin3lo( );
                OutputChiller=0;
                //end: ENTRY function
        }
```

```
                //begin: ACTION function
                //end: ACTION function
                if (EnableChiller==1.){
                        //begin: EXIT function
                        //end: EXIT function
                        cont=FALSE;
                        task[4].nextState = task4state1;
                }
}
void task4state1( ){ static cont = FALSE;
        if (cont==FALSE){
                cont=TRUE;
                //begin: ENTRY function
                TimerChiller=0;
        TimeOffChiller=DutyChiller*PeriodChiller;
                Pin3hi( );
                OutputChiller1;
                //end: ENTRY function
        }
        //begin: ACTION function
        TimerChiller+= (float)task[4].timeSinceLast;
        //end: ACTION function
        if (TimerChiller>TimeOffChiller && DutyChiller>=1.){
                        //begin: EXIT function
                        //end: EXIT function
                        cont=FALSE;
                        task[4].nextState = task4state1;
        }
        if (TimerChiller>TimeOffChiller && DutyChiller<1.){
                        //begin: EXIT function
                        //end: EXIT function
                        cont=FALSE;
                        task[4].nextState = task4state2;
        }
        if (EnableChiller<1){
                        //begin: EXIT function
                        //end: EXIT function
                        cont=FALSE;
                        task[4].nextState = task4state0;
        }
}
void task4state2( ){ static cont = FALSE;
        if (cont==FALSE){
                cont=TRUE;
                //begin: ENTRY function
                Pin3lo( );
                OutputChiller=0;
                //end: ENTRY function
        }
        //begin: ACTION function
        TimerChiller+= (float)task[4].timeSinceLast;
        //end: ACTION function
        If (TimerChiller>PeriodChiller && DutyChiller<=0){
                        //begin: EXIT function
                        //end: EXIT function
                        cont=FALSE;
                        task[4].nextState = task4state2;
        }
        if (TimerChiller<PeriodChiller && DutyChiller>0){
                        //begin: EXIT function
                        //end: EXIT function
                        cont=FALSE;
                        task[4].nextState = task4state1;
        }
}
//begin: task5 states////////////////////////////////////////////
void task5state0( ){ static cont = FALSE;
        if (cont==FALSE){
                cont=TRUE;
                //begin: ENTRY function
                DataCount=0;
                //end: ENTRY function
        }
```

```
            //begin: ACTION function
            DataCount=0;
            //end: ACTION function
            if (CollectDate==TRUE){
                    //begin: EXIT function
                    //end: EXIT function
                    cont=FALSE;
                    task[5].nextState = task5state1;
            }
}
void task5state1( ){ static cont = FALSE;
            if (cont==FALSE){
                    cont=TRUE;
                    //begin: ENTRY function
                    DataTime=0;
                    //end: ENTRY function
            }
            //begin: ACTION function
            DataTime+= (float)(task[5].timeSinceLast)/1000.;
            If (DataCount<MAX_DATA_COUNT) {
                    Data1[DataCount]=DataTime;
                    Data2[DataCount]=TairMeasured;
                    Data3[DataCount]=TairSetpoint;
                    Data4[DataCount]=TsatMeasured;
                    Data5[DataCount]=TsetSetpoint;
                    Data6[DataCount]=RHMeasured;
                    Data7[DataCount++]=RHSetpoint;
            }
            //end: ACTION function
            if (CollectData==FALSE){
                    //begin: EXIT function
                    //end: EXIT function
                    cont=FALSE;
                    task[5].nextState = task5state0;
            }
}
//begin: initializationTask/////////////////////////////////////////
void initializationTask( ) {
            //Initialize serial comm
            initCommunications( );
            CommInitialized=TRUE;
            //Initialize DAQ
            USE_E_Series_AI( );
            AI_Clear(AI_DEVICE);
            //initialize Screen
            clrscr( );
}
//begin: shutdown/////////////////////////////////////////////////
void shutdownTask( ) {
            int ix;
            FILE * fp;
            //Set all outputs low
            Pin2lo( );
            Pin3lo( );
            //Write data to file
            fp=fopen*"data.tx","wt");
            for (ix=0; ix<DataCount; ix++) {
            fprintf(fp."%f\t%f\t%f\t%f\t%f\t%f\t%f\n",Data1[ix],
Data2[ix],Data3[ix],
Data4[ix],Data5[ix],Data6[ix],Data7[ix]);
            }
            fclose(fp);
}
/*******************************************************************
File: Screen.c
                                        Bryan Wade
Creates a simple text ui for real-time systems. The interface
entities are 1) static messages (e.g. a title), 2) outputs with
labels,
3) inputs with labels (increment/decrement by user-defined
amount), and 4)
access to the ESC key.
Use:
1)#include "screen.h"
2)define struct arrays: ScreenMsg[ ],ScreenItem[ ] (inputs)
ScreenItem[ ] (outputs)
```

-continued

```
3)void SetupScreen(struct ScreenMsg* msg, int numMsgs,
struct ScreenInputItem input.
                    int numInputs, struct ScreenOutputItem*
output, int numOutpus, int* ESC_flag);
4)void DoScreenInputs( );                              --
process keyboard buffer for input commands
5)void DoScreenOutputs( );                             --
updates outputs (one output per call)
*******************************************************************/
#include <conio.h>
#include <stdio.h>
#include "screen.h"
static struct ScreenMsg* msg;
static int maxMsgIndex;
static struct ScreenInputItem* inItem;
static int maxInputIndex;
static struct ScreenOutputItem* outItem;
static int maxOutputIndex;
static int* escFlag;
static int* spaceFlag;
///////////////////////////////////////////////
void DoScreenInput( ){
        int c;
        static int index=0;
        while(kbhit( ){
                c = getch( );
                switch (c){
                                case UP:
        gotoxy(INPUT_CURS_COL,inItem[index].pos);
        printf(" ");
        index = (index ==0)? maxInputIndex :index-1;
        gotoxy(INPUT_CURS_COL,inItem[index].pos);
        printf(">");
        break;
                                case DOWN:
        gotoxy(INPUT_CURS_COL.inItem[index].pos);
        printf(" ");
        index = (index ==maxInputIndex)? 0 : index+1;
        gotoxy(INPUT_CURS_COL,inItem[index].pos);
        printf(">");
        break;
                                case LEFT:
        *(inItem[index].address)-=inItem[index].delta;
        if (*(inItem[index].address) < inItem[index].min){
                        *(inItem[index].address) =
inItem[index].min;}
        gotoxy(INPUT_VALU_COL,inItem[Index].pos);
        printf("%7.2f ",*(inItem[Index].address));
        break;
                                case RIGHT:
        *(inItem[index].address)+=inItem[index].delta;
        if (*(inItem[index].address) > inItem[index].max){
                        *(inItem[index].address) =
inItem[index].max;}
        gotoxy(INPUT_VALU_COL,inItem[index].pos);
        printf("%7.2f ",*(inItem[index].address));
        break;
                                case ESC:
        *escFlag=1;
        break;
                                case SPACE:
        *spaceFlag=1;
        break;
                                }
        }
}
///////////////////////////////////////////////
void DoScreenOutput( ){
        static int index=0;
        gotoxy(OUTPUT_VALU_COL,outItem[index].pos);
        if (outItem[index].iPtrl=NULL)
                        printf("%d ",*(outItem[index].iPtr));
        else
                        printf("%7.2f ",*(outItem[index].fPtr));
        index = (index<maxOutputIndex) ? Index + 1: 0;
}
```

```
//////////////////////////////////////////////////
void SetupScreen(struct ScreenMsg* m, int nm, struct
ScreenInputItem* ii,int ni,
           struct ScreenOutputItem* oi,int no, int* e, int* spc){
           int i;
           //set the global ptrs
           msg=m;
           maxMsgIndex = nm-1;
           inItem=ii;
           maxInputIndex=ni-1;
           outItem=oi;
           maxOutputIndex=no-1;
           escFlag = e;
           spaceFlag = spc;
           //setup messages
           for (i=0; i<=maxMsgIndex; i++){
                      gotoxy(msg[i].x,msg[i].y);
                      printf("%s",msg[i].text);
           }
           //setup inputs
           for (i=0; i<=maxInputIndex; i++){
           gotoxy(INPUT_NAME_COL,inItem[i].pos);
                      printf("%s",inItem[i].name);
           gotoxy(INPUT_VALU_COL,inItem[i].pos);
                      printf("%7.2f",*(inItem[i].address));
           }
           gotoxy(INPUT_CURS_COL,inItem[0].pos);
           printf(">");
           //setup outputs
           for (i=0; i<=maxOutputIndex; i++){
           gotoxy(OUTPUT_NAME_COL,outItem[i].pos);
                      printf("%s",outItem[i].name);
           gotoxy(OUTPUT_VALU_COL,outItem[i].pos);
                         if (outItem[i].iPtr!=NULL)
                         printf("%d ",*(outItem[i].iPtr));
           else
                         printf("%7.2f ",*(outItem[i].fPtr));
           }
}
/*******************************************************************
File: Thc_fcns.c
           Bryan Wade
This file contains functions for the DCCC controller.
This includes the steam table equations end routines for
communicating with
the HMP230 sensor.
*******************************************************************/
#include "thc_fcns.h"
#include <math.h>
#include "bios.h"
#include     <string.h>
#define COM0 //0=COM1, 1=COM2
#define TRUE 1
#define FALSE 0
#define CR 0x0D
#define NUL 0
#define READY_TO_WRITE 0x2000
#define DATA_READY 0x100
/*The following equations are based on material in the text:
_Steam and Gas Tables with Computer Control_, Irvine and
Liley, 1984.
*/
float
Tsat_steamTable(float P){
           const double A = .426776e2;
           const double B = -.389270e4;
           const double C = -.94865e1;
return A + B/(log(P) + C);
}
float
Psat_steamTable(float T){
           const float A0 = .104592e2;
           const float A1 = -.404897e-2;
           const float A2 = -.417520e-4;
           const float A3 = .368510e-6;
           const float A4 = -.101520e-8;
           const float A5 = .865310e-12;
           const float A6 = .903668e-15;
           const float A7 = -.199690e-17;
```

```
            const float A8 = .779287e-21;
            const float A9 = .191482e-24;
            const float A10= -.396806e4;
            const float A11= .395735e2;
return
exp(A0+A1*T+A2*pow(T,2.)+A3*pow(T,3.)+A4*pow(T,4.)+A5*pow(T,5.)+
            A6*pow(T,6.)+A7*pow(T,7.)+A8*pow(T,8.)+A9*pow(T,9.)+A10/(T-A11));
}
void
initCommunications(void){
            init init_data, doneFlag;
            char ch, buf[10];
            unsigned int ix=0,tries;
            init_data = (_COM_CHR8 |_COM_STOP1 | _COM_NOPARITY I _COM_9600);
            _bios_serialcom(_COM_INIT, COM, init_data);
            //Repeat request until get a good response
            //(Some times HMP230 takes a couple tries to work at first)
            for (doneFlag=FALSE;doneFlag==TRUE;) {
                        txChar(CR);
                        txChar('S');
                        txChar('E');
                        txChar('N');
                        txChar('D');
                        txChar(CR);
                        for (ix=0,tries=0; ix<11;) {
                                    ch=rxChar( );
                                    if (ch!=NUL) buf[ix++]=ch;
                                    if (++tries>20000) break;
                        }
                        if (buf[3]=='.' && buf[3]=='.')
doneFlag=TRUE;
            }
}
char
rxChar(void){
            char ch;
            unsigned int status;
            status = _bios_serialcom(_COM_STATUS, COM, 0);
            if (status & DATA_READY){
                        ch = 0x7f & _bios_serialcom(_COM_RECEIVE, COM, 0);
                        return(ch);
            }
return(NUL);
}
void
txChar(char ch){
            unsigned int status;
            //wait
            status = READY_TO_WRITE & _bios_serialcom(_COM_STATUS, COM, 0 );
            while (status != READY_TO_WRITE && 0){
                        status = READY_TO_WRITE & _bios_serialcom (_COM_STATUS, COM, 0);
            }
            //send char
            _bios_serialcom(_COM_SEND, COM, ch );
}
int
getHMP230Readings(float *rh, float *t) {
            char ch, buf[10];
            unsigned int ix=0,tries;
                        for (ix=0,tries=0; ix<6;) {
                        ch=rxChar( );
                        if (ch!=NUL) {
                                    buf[ix++]=ch;
                        }
                        if (++tries>40000) {
                                    txChar(CR);
                                    return 0;
                        }
            }
```

```
                buf[ix]=NUL;
                if (buf[3] =='.') *rh= atof(buf);
                else
                        return 0;
                for (ix=0,tries=0; ix<5;) {
                        ch=rxChar( );
                        if (ch!=NUL) {
                                buf[ix++]=ch;
                        }
                        if (++tries>40000) {
                                txChar(CR);
                                return 0;
                        }
                }
                buf[ix]=NUL;
                if buf[2] == '.')   *t= atof(buf);
return 0;
}
/**********************************************************************
File: Milliclk.c
        Bryan Wade
Milliclk uses the timer interrupt to maintain a 1 ms
resolution clock.
Use:
1) #include "milliclk.h"
2)void SetupMilliClock( ); sets up timer interrupt and resets
clock to 0
3)int MilliClock(1);     gets time (ms) since last reset
4)int MilliClock(0);     gets time (ms) since last reset & resets
clock to 0
5)void ShutdownMilliClock( );       resets interrupt to DOS
default – very important!
**********************************************************************/
#include <dos.h>
#include "milliclk.h"
void interrupt (*old_vect)( );
static int count;
static int milliCount;
static int running=0;
///////////////////////////////////////////////////////////
void SetupMilliClock( ){
        if (!running) {
                milliCount = 0;
                old_vect=getvect(CK_VECT);
                disable( );
                setvect(CK_VECT, timer_ISR);
                setalarm(1.0);
                enable( );
                running=1;
        }
}
///////////////////////////////////////////////////////////
int ShutdownMilliClock( ){
        if (running){
                disable( );
                setalarm(0.0);/*set back to DOS
default*/
                setvect(CK_VECT,old_vect);
                enable( );
                running=0;
        }
return(1);
}
///////////////////////////////////////////////////////////
int MilliClock(int flag){
        int temp = milliCount;;
        if (flag==0) milliCount = 0;
return temp;
}
///////////////////////////////////////////////////////////
void interrupt timer_ISR(void){
/*manipulate floating point processor stack*/
asm sub SP,94
asm mov BP,SP
asm fsave[BP]
asm fwait
milliCount++;
```

```
/*send EOI*/
outport(0x20,0x60);
/*manipulate floating point processor stack*/
asm mov BP,SP
asm frstor[BP]
asm add SP,94
asm fwait
}
/////////////////////////////////////////////////////////////////////
int setalarm (double ms){
        if((ms>0.0) && (ms<=MAX_MS)){
                count=(CLOCKFREQ*ms) / 1000.0 +
0.5;
    outportb(TIMER_CTL, 0x36);
                outportb(TIMER, count&0xFF);
                outportb(TIMER, (count>>8)&0xFF);
        }else if (ms<=0.0){
                outportb(TIMER_CTL, 0x36);
                outportb(TIMER, DOS_COUNT&0XFF);
                outportb(TIMER,
(DOS_COUNT>>8)&0XFF);
                count=DOS_COUNT;
        }else{
                return(1);/*error return*/
        }
        return(0);/*normal return*/
}
/**********************************************************************
File: LPT_IO.c                    Bryan Wade
Functions for using parallel port for digital I/O. Now that we
have the NI data acquisition board it would be easier to use it
for I/O rather than this.
**********************************************************************/
#include <dos.h>
#define BASE 0x378 /* Usually lpt1 is 0x378 & lpt2 is 0x278. */
static int dataByte = 0x00;
static int inputByte = 0x00;
static int controlByte = 0x00;
void Pin2hi( ){
        dataByte |= 0x01;
        outportb(BASE+0,dataByte);
}
void Pin2lo( ){
        dataByte & 0xFE;
        outportb(BASE+0,dataByte);
}
void Pin3hi( ){
                dataByte |= 0x02;
                outportb(BASE+0,dataByte);
}
void Pin3lo( ){
                dataByte &= 0xFD;
                outportb(BASE+0,dataByte);
}
void Pin4hi( ){
                dataByte |= 0x04;
                outportb(BASE+0,dataByte);
}
void Pin4lo( ){
                dataByte &= 0xFB;
                outportb(BASE+0,dataByte);
}
void Pin5lo( ){ //inverted
                dataByte |= 0x08;
                outportb(BASE+0.dataByte);
}
void Pin5hi( ){ //inverted
                dataByte & 0xF7;
                outportb(BASE+0.dataByte);
}
void Pin6hi( ){
                dataByte |= 0x10;
                outportb(BASE+0.dataByte);
}
void Pin6lo( ){
                dataByte &= 0xEF;
                outportb(BASE+0,dataByte);
}
```

-continued

```
int ShutdownLPT( ){
          outportb(BASE+0,0x00);
return(1);
}
/*******************************************************************
File: Sched.h*
*******************************************************************/
//begin: sched defines///////////////////////////////////////////////
#define EMPTY -1
#define EPS 1e-9
#define USER_STOP 1
#define STACK_STOP 2
#define FILE_STOP 3
#define STEPPING_STOP 4
#define COMM_STOP 5
struct taskStruct{
          int Tsamp;
          int timeLeft;
          void (*nextState)( );
          int priority;
          int timeSinceLast;
} ;
//begin: sched function prototypes///////////////////////////////////
void fillQueues(int* fgQueue,int* numFG,int* bgQueue,int*
numBG,
          unsigned long* taskCount);
void shutdownScheduler( unsigned long startTime, unsigned
long passes,
          unsigned long* taskCount, int stackIndex);
void StopScheduling(int stopType);
/*******************************************************************
File: Tasks.h
*******************************************************************/
//task0 states prototypes
void task0state0( ); //user interface
//task1 state prototypes
void task1state0( ); //go on
void task1state1( ); //process control algorithm
//task2 state prototypes
void task2state0( ); //go on
void task2state1( ); //request RH,Tair and wait for response
void task2state2( ); //read Tsat
//task3 state prototypes
void task3state0( ); //heater output disabled
void task3state1( ); //heater PWM hi
void task3state2( ); //heater PWM lo
//task4 state prototypes
void task4state0( ); //Chiller output disabled
void task4state1( ); //Chiller PWM hi
void task4state2( ); //Chiller PWM lo
//task5 state prototypes
void task5state0( ); //Don't collect data
void task5state1( ); //Collect data
//initializationTask prototype
void initializationTask(void);
//shutdownTask prototype
void shutdownTask(void);
//end: state prototyping/////////////////
//begin: Tasks module defines
extern struct taskStruct task[ ];
#define FALSE 0
#define TRUE 1
#define HUGE 1.0e9
/*******************************************************************
File Screen.h
*******************************************************************/
#define UP               '8'
#define DOWN             '2'
#define LEFT             '4'
#define RIGHT            '6'
#define ESC              0x1b
#define SPACE ' '
#define INPUT_NAME_COL 6
#define INPUT_CURS_COL 5
#define INPUT_VALU_COL 18
#define OUTPUT_NAME_COL 49
#define OUTPUT_VALU_COL 61
```

-continued

```
void DoScreenInput(void);
void DoScreenOutput(void);
void SetupScreen(struct ScreenMsg*,int, struct
ScreenInputItem*,int,
        struct ScreenOutputItem*,int,int*,int*);
struct ScreenInputItem {
        char name[12];
        int pos;
        float delta;
        float min;
        float max;
        float* address;
};
struct ScreenOutputItem {
        char name[12];
        int pos;
        int* iPtr;
        float* fPtr;
};
struct ScreenMsg {
        char text[80];
        int x;
        int y;
};
Typedef unsigned char BYTE;
```

What is claimed:

1. A system for controlling the temperature and humidity of gas, comprising:
   a contactor, including contact media, a gas inlet and a gas outlet, a liquid inlet and a liquid outlet, wherein the liquid inlet admits a liquid above the contact media and the gas inlet admits gas below the contact media, and the liquid and gas flow external to the contact media such that the gas leaves through the gas outlet in saturated state;
   a heater;
   a chiller for chilling the liquid;
   a gas outlet line connecting the gas outlet to the heater;
   a liquid outlet line connecting the liquid outlet to the chiller, wherein the liquid flows through the liquid inlet, the contactor, the liquid outlet and the chiller;
   a saturated temperature sensor associated with the gas outlet line and upstream of the heater;
   a dry bulb temperature sensor associated with the gas outlet line and downstream of the heater;
   a gas temperature set point; a relative humidity set point;
   a controller, including a computer, coupled to the saturated temperature sensor, the dry bulb temperature sensor, the gas temperature set point, the relative humidity set point, and the computer, wherein the saturated temperature sensor, the relative humidity set point, and the gas temperature set point are inputs to the computer to produce a command signal adjusting the cooling rate of the chiller, wherein the dry bulb temperature sensor and the gas temperature set point are inputs to the computer to produce a command signal adjusting the heating rate of the heater, wherein the controller adjusts the heater and the chiller to deliver the gas from the heater at a desired temperature and relative humidity; and
   a sprinkler above the contact media and within one inch of the contact media to distribute the liquid uniformly on the contact media;
   a gas outlet at least four inches above the sprinkler;
   a duct coupled to the gas outlet having a heater and a blower, the duct coupled to a diffuser box, the diffuser box having a sloped wall and coupled to a filter such that gas exiting from the diffuser box through the filter is uniformly distributed.

2. The system of claim 1, further comprising a pump located between the chiller and the sprinkler to supply liquid to the sprinkler, and a gas blower to supply gas to the gas inlet.

3. The system of claim 2, wherein the contactor further comprises a housing and the sprinkler includes at least one arm with a plurality of orifices along the arm and pointed between parallel and opposite the top of the contract media and wherein the sprinkler engages in self-rotation from reactive force exerted against the arm(s) from distribution of the liquid from the orifices, the orifices having a relative spacing and direction such that entrainment of mist in the gas outlet is reduced.

4. The system of claim 1, further comprising a reservoir with a make-up inlet line to introduce liquid into the reservoir and a removal outlet line to remove liquid from the reservoir, a low sensor which generates a signal to a liquid supply means whenever the level of the liquid is low to supply additional liquid through the make-up inlet to the reservoir, a high sensor which generates a signal whenever the level of the liquid is too high to remove liquid through the removal inlet from the reservoir.

5. The system of claim 1, wherein the controller sends a signal to a liquid supply means to admit fresh liquid from the supply means at periodic times to maintain liquid purity requirements and such that the chiller can maintain the liquid at a desired temperature.

6. The system of claim 1, wherein the contact media is tower packing formed so as to have a large area/volume of material.

7. The system of claim 1 wherein the contact media is a material having a large area/volume and is selected from the group consisting of refrigerated coils, and tubes.

8. The system of claim 1 wherein the chiller includes a refrigeration system and a heat exchanger, the heat exchanger including a matrix of thermal electric chips disposed between two plates.

9. A system of controlling the temperature and humidity of air, comprising:
- a contactor, including a housing with contact media, an air inlet and an air outlet, a water inlet and a water outlet, wherein the water inlet admits water above the contact media and the air inlet admits air below the contact media, and the water and air flow external to the contact media such that the air leaves through the air outlet in saturated state;
- a heater;
- a chiller for chilling the water;
- an air outlet line connecting the air outlet to the heater;
- a water outlet line connecting the water outlet to the chiller, wherein the water flows through the water inlet, the contactor, the water outlet and the chiller;
- a saturated air temperature sensor associated with the air outlet line and upstream from the heater;
- a dry bulb air temperature sensor associated with the air outlet line and downstream from the heater;
- an air temperature set point;
- a relative humidity set point;
  - a controller, including a computer, coupled to the saturated air temperature sensor, the dry bulb air temperature sensor, the air temperature set point, the relative humidity set point, and the computer, wherein the saturated air temperature sensor, the relative humidity set point, and the air temperature set point are inputs to the computer to produce a command signal adjusting the cooling rate of the chiller, wherein the dry bulb air temperature sensor and the air temperature set point are input to the computer to produce a command signal adjusting the heating rate of the heater, wherein the controller adjusts the heater and the chiller to deliver air from the heater at a desired temperature and relative humidity; and
- a sprinkler above the contact media and within one inch of the contact media to distribute the liquid uniformly on the contact media;
- an air outlet at least four inches above the sprinkler;
- a duct coupled to the air outlet having a heater and a blower, the duct coupled to a diffuser box, the diffuser box having a sloped wall and coupled to a filter such that air exiting from the diffuser box through the filter is uniformly distributed.

10. The system of claim 9, further comprising, a pump located upstream from the chiller to supply water to the sprinkler, and an air blower located between the heater and a filter.

11. The system of claim 10, wherein the housing is cylindrical in shape, and the sprinkler includes at least one arm with a plurality of orifices along the arm and pointed between parallel and opposite the top of the contact media and wherein the sprinkler engages in self-rotation from reactive force exerted against the arm(s) from distribution of the water from the orifices, the orifices having a relative spacing and direction such that entrainment of mist in the air outlet is reduced.

12. The system of claim 9, further comprising a reservoir with a make-up inlet line to introduce water into the reservoir and a removal outlet line to remove water from the reservoir, a low sensor which generates a signal to a water supply means whenever the level of the water is low to supply additional water through the make-up inlet to the reservoir, a high sensor which generates a signal whenever the level of the water is too high to remove water through the removal inlet from the reservoir.

13. The system of claim 9, wherein the controller sends a signal to a water supply means to admit fresh water from the supply means at periodic times to maintain water purity requirements and such that the chiller can maintain the water at a desired temperature.

14. The system of claim 9, wherein the contact media is tower packing formed so as to have a large area/volume of material.

15. The system of claim 9 wherein the contact media is a material having a large area/volume and is selected from the group consisting of refrigerated coils, and tubes.

16. The system of claim 9 wherein the chiller includes a refrigeration system and a heat exchanger, the heat exchanger including a matrix of thermal electric chips disposed between two plates.

* * * * *